US011017289B2

(12) United States Patent
Crawford et al.

(10) Patent No.: US 11,017,289 B2
(45) Date of Patent: May 25, 2021

(54) METHOD AND SYSTEM FOR IMPROVING A POLICY FOR A STOCHASTIC CONTROL PROBLEM

(71) Applicant: 1QB INFORMATION TECHNOLOGIES INC., Vancouver (CA)

(72) Inventors: Daniel Crawford, Vancouver (CA); Pooya Ronagh, Vancouver (CA); Anna Levit, Coquitlam (CA)

(73) Assignee: 1QB INFORMATION TECHNOLOGIES INC.

( * ) Notice: Subject to any disclaimer, the term of this patent is extended or adjusted under 35 U.S.C. 154(b) by 927 days.

(21) Appl. No.: 15/590,614

(22) Filed: May 9, 2017

(65) Prior Publication Data

US 2017/0323195 A1    Nov. 9, 2017

Related U.S. Application Data

(60) Provisional application No. 62/333,707, filed on May 9, 2016.

(51) Int. Cl.
*G06N 3/04* (2006.01)
*G06N 10/00* (2019.01)
(Continued)

(52) U.S. Cl.
CPC .......... *G06N 3/0472* (2013.01); *G06E 3/005* (2013.01); *G06N 3/0445* (2013.01); *G06N 3/08* (2013.01);
(Continued)

(58) Field of Classification Search
CPC ........ G06N 7/005; G06N 10/00; G06N 20/00; G06N 3/088; G06N 3/0472; G06E 3/005
See application file for complete search history.

(56) References Cited

U.S. PATENT DOCUMENTS 8,421,053 B2   4/2013  Bunyk et al.
9,015,093 B1   4/2015  Commons
(Continued)

FOREIGN PATENT DOCUMENTS

WO    WO 2015/006494 A1    1/2015

OTHER PUBLICATIONS

Chakrabarti et al., "Transverse Ising System in Higher Dimensions (Pure Systems)" in: Quantum Ising Phases and Transitions in Transverse Ising Models. Lecture Notes in Physics Monographs, vol. 41. Springer, Berlin, Heidelberg (1996) (Year: 1996).*
(Continued)

*Primary Examiner* — Baboucarr Faal
*Assistant Examiner* — Yao D Huang
(74) *Attorney, Agent, or Firm* — Pearl Cohen Zedek Latzer Baratz LLP

(57) ABSTRACT

A method and system for improving a stochastic control problem policy, the method including a sampling device obtaining data representing sample Boltzmann machine configurations, obtaining a stochastic control problem's initialization data and initial policy; assigning representative data of initial coupler weights and node biases and the Boltzmann machine's transverse field strength to the sampling device; until a stopping criterion is met, generating a present-epoch state-action pair, amending, sampling for the present-epoch state-action pair, approximating a present-epoch state-action Q-function value, obtaining a future-epoch state-action pair through a stochastic state process including a stochastic optimization test on all state-action pairs to provide the action at the future-epoch and update the future-epoch state's policy; amending the representative data, sampling for the future-epoch state-action pair, obtaining a future-epoch state-action Q-function value, updating each weight
(Continued)

and bias and providing the policy when the stopping criterion is met.

37 Claims, 2 Drawing Sheets

(51) Int. Cl.
G06N 20/00 (2019.01)
G06N 3/08 (2006.01)
G06N 7/00 (2006.01)
G06E 3/00 (2006.01)

(52) U.S. Cl.
CPC ............ *G06N 3/088* (2013.01); *G06N 7/005* (2013.01); *G06N 10/00* (2019.01); *G06N 20/00* (2019.01)

(56) References Cited

U.S. PATENT DOCUMENTS

| | | | |
|---|---|---|---|
| 2005/0131848 A1* | 6/2005 | Chickering | G06N 20/00 706/12 |
| 2006/0225165 A1 | 10/2006 | Van den Brink et al. | |
| 2008/0274898 A1* | 11/2008 | Johnson | G06N 10/00 505/190 |
| 2009/0306866 A1 | 12/2009 | Malikopoulos | |
| 2014/0297247 A1* | 10/2014 | Troyer | G06F 30/20 703/21 |
| 2015/0046681 A1 | 2/2015 | King | |
| 2016/0162798 A1 | 6/2016 | Marandi et al. | |
| 2017/0132699 A1* | 5/2017 | Hagell | G06Q 40/00 |
| 2017/0255871 A1* | 9/2017 | Macready | G06K 9/6277 |
| 2018/0308007 A1* | 10/2018 | Amin | B82Y 10/00 |

OTHER PUBLICATIONS

Dmitry Ioffe, "Stochastic Geometry of Classical and Quantum Ising Models" in: Kotecký R. (eds) Methods of Contemporary Mathematical Statistical Physics. Lecture Notes in Mathematics, vol. 1970, pp. 87-127. Springer, Berlin, Heidelberg (2009) (Year: 2009).*
Cooper et al., "Convergence of Simulation-Based Policy Iteration" in Probability in the Engineering and Informational Sciences, Sep. 2002 (Year: 2002).*
Bellman, R., "A Markovian Decision Process", Journal of Mathematics and Mechanics, vol. 6, No. 5, 1957.
Sallans, B. et al., "Reinforcement Learning with Factored States and Actions", Journal of Machine Learning Research, vol. 5, pp. 1063-1088, 2004.
Ackley, D. et al., "A Learning Algorithm for Boltzmann Machines", Cognitive Science, vol. 9, pp. 147-169, 1985.
Bengio, Y. et al., "Representation Learning: A Review and New Perspectives", IEEE Transactions on Pattern Analysis and Machine Intelligence, vol. 35, No. 8, pp. 1798-1828, Aug. 2013. Accessible via website: http://www.cl.uni-heidelberg.de/courses/ws14/deepl/BengioETAL12.pdf.
Nielsen, M., "Neural Networks and Deep Learning", Chapter 6—Deep Learning, May 2017. Accessible via website: http://neuralnetworksanddeeplearning.com/chap6.html.
Barone, et al. "Physics and Applications of the Josephson Effect", John Wiley and Sons, New York, 1982.
Martinis, J., et al., "Rabi oscillations in a large Josephson-junction qubit", Physical Review Letters, vol. 89, No. 11, pp. 117901-1-117901-4, Sep. 9, 2002.
Farhi, E. et al., "Quantum Adiabatic Evolution Algorithms versus Simulated Annealing", Jan. 8, 2002, pp. 1-16. Accessible via website: https://arxiv.org/abs/quant-ph/0201031.
McGeoch, C. et al., "Experimental Evaluation of an Adiabatic Quantum System for Combinatorial Optimization", Computing Frontiers, May 14-16, 2013.
Bian, Z. et al., "The Ising model: teaching an old problem new tricks", D-Wave Systems, Aug. 30, 2010.
Amin, M. et al., "Quantum Boltzmann Machine", Jan. 8, 2016. Accessible via website: https://arXiv:1601.02036.
International Search Report of PCT Application No. PCT/IB2017/052702, dated Jul. 5, 2017.

* cited by examiner

METHOD AND SYSTEM FOR IMPROVING A POLICY FOR A STOCHASTIC CONTROL PROBLEM

CROSS-REFERENCE TO RELATED APPLICATION

The present patent application claims the benefit of U.S. Provisional Patent Application No. 62/333,707, filed on May 9, 2016.

FIELD OF THE INVENTION

The invention relates to computing. More precisely, this invention pertains to a method and system for improving a policy for a stochastic control problem.

BACKGROUND OF THE INVENTION

Markov Decision Processes

Stochastic control problems aim to design a policy to control the states of a system that evolves through a stochastic process in order to maximize utility.

Markov Decision Processes (MDPs) are particular types of stochastic control problems that satisfy a Markov property.

Markov decision processes are widely used to model sequential decision making under uncertainty.

Many problems involve Markov decision processes, such as population harvesting, controlling water resources for irrigation and power generation, equipment replacement in any industry, portfolio optimization in finance and investment, scheduling in queue theory and operation research, generating credit and insurance policies, overbooking management, quarantine and treatment levels in health and pharmaceutical applications, generating sports strategies, emergency response vehicle locations.

In fact, given a system with some inherent stochastic evolution, how can a decision maker make decision to maximize some system-dependent utility function over multiple epochs when these decisions may affect the system?

Formally, a Markov decision process can be defined by the following four components.

1. A set of decision epochs $T=\{n, n+1, \ldots, m\}$, where m can be finite or infinite. It will be appreciated that the set of decision epochs represent a set of times at which a decision has to be made. For instance in the case where the problem involving a Markov decision process is equipment replacement, the set of decision epochs may be every sequential day of usage of the equipment.

2. A space S of states. It will be appreciated that any state in the state space contains data representative of a realization of the system. For instance, in the case where the problem involving a Markov decision process is the equipment replacement problem, the state space may be a set of integers representative of the condition of the equipment.

3. A space A of actions. It will be appreciated that any action in the action space contains data representative of possible controls of the system. For instance, in the case where the problem involving a Markov decision process is the equipment replacement problem, the action space may consist of two actions, to replace or not to replace the equipment.

4. Instantaneous rewards $r: S \times A \times T \to \mathbb{R}$. It will be appreciated that the instantaneous reward represents the consequence of taking an action while the system is in a given state at a given decision epoch. For instance, in the case where the problem involving a Markov decision process is the equipment replacement problem, the instantaneous reward may be an integer that is negative if the action is to replace the equipment representative of the cost of replacement of the equipment and is a positive integer otherwise. The positive integer, is larger when the equipment is operating in better condition.

It will be appreciated that transition probabilities $\mathbb{P}_t(s_{t+1}|s_t, a_t)$ are probabilities for a transition from a given state to another given state. The Markov property of a Markov decision process can be written as $$\mathbb{P}_t(s_{t+1}|s_t, a_t) = \mathbb{P}_t(s_{t+1}|s_t, a_t, s_{t-1}, a_{t-1}, \ldots, s_{t+k}, a_{t-k})$$

For instance, in the case where the problem involving a Markov decision process is the equipment replacement problem, and the equipment has 3 conditions (failing, bad, good) the transition probabilities may be independent of time and given by the transition probability matrix $$\mathbb{P}(-|\text{''do not replace''}) = \begin{pmatrix} 1 & 0 & 0 \\ 0.6 & 0.4 & 0 \\ 0.2 & 0.7 & 0.1 \end{pmatrix}$$

and $$\mathbb{P}(-|\text{''replace''}) = \begin{pmatrix} 0 & 0 & 1 \\ 0 & 0 & 1 \\ 0 & 0 & 1 \end{pmatrix}.$$

5. A discount factor $\gamma \in [0,1)$. It is appreciated that the discount factor represents the difference in importance between future rewards and present rewards.

A policy is defined as a function $\alpha: S \times T \to A$. It is therefore appreciated that a policy is an assignment of an action to a state of the system at each decision epoch. For instance, in the case where the problem involving a Markov decision process is the equipment replacement problem, a policy may be to replace the equipment only when the equipment is at failing condition and otherwise not to replace the equipment. The skilled addressee will also appreciate that a utility function can be defined as $U_n(s_n, \alpha) = \Sigma_{t=n}^{m} \gamma^{t+1} \mathbb{E}_{n,\alpha}(r_t(s_t, a_t))$ where the summands are discounted expected values of future rewards conditional to a given initial state $s_n$ and a policy $\alpha$. The skilled addressee will therefore appreciate that a decision maker may wish to maximize the utility function, i.e., find $U_n^*(s_n) = \max_\alpha U_n(s_n, \alpha)$, which in turn means find an optimal policy: $\alpha^* = \operatorname{argmax}_\alpha U_n(s_n, \alpha)$.

The skilled addressee will appreciate that the utility function when maximizing over the action to be taken in the current decision epoch and continuing using an optimal policy will be called a Q-Function, and can be written as $Q(s_n, a_n) = r_n(s_n, a_n) + U_{n+1}^*(s_n, \alpha)$, and when $Q(s_n, a_n)$ is maximized over $a_n$, we obtain an optimal state-action pair.

It will be appreciated that finding an optimal policy can be very cumbersome. In fact, finding solutions to the Markov decision process problem can be problematic when state, action, and/or decision epoch sets become too large, or when transition probabilities are unknown.

In the literature algorithms for which the lower bound on the computational complexity of an algorithm grows exponentially with respect to the dimension of the problem, are said to suffer from the curse of dimensionality. A common method for solving Markov Decision Process problems is value iteration method [Richard Bellman, "A Markovian Decision Process", Journal of Mathematics and Mechanics, Vol. 6, No. 5 (1957)] which has an exponential complexity in the general case; that is $\Omega(2^d)$ where d denoted the dimension of the Markov decision process problem.

There exist a number of methods to overcome the curse of dimensionality problem such as Q-learning type methods [Richard S. Sutton, Andrew G. Barto]. However, these methods require storing values of Q-function for all the possible state-action pairs which becomes unfeasible for certain problem sizes. In order to overcome this drawback a parametrization of Q-function by Neural Networks was proposed (for example [Sallans, B., Hinton, G. E., Reinforcement Learning with Factored States and Actions, Journal of Machine Learning Research 5, 1063-1088, 2004]), but this involves training a Neural Network, which requires fitting a Neural Network, which is a standalone open question and also requires training a Neural Network, which in some cases requires solving an NP-hard problem.

There is therefore a need for a method for improving a policy that will overcome at least one of the above-identified drawbacks.

Artificial Neural Networks

Artificial Neural Networks (ANN) are computational models inspired by biological neural networks and are used for approximation of functions. Artificial Neural Networks have graph theoretical representations where the nodes of the graph are also called the neurons and the edges of it are also known as synapses.

General Boltzmann Machines (GBM) are a type of Artificial Neural Networks where the neurons represent random variables with a linear bias attached to them and every synapse between two neurons represents a quadratic term involving the random variables associated to the neurons. In particular, there is a global energy function associated to the general Boltzmann machines consisting of contributions from all the linear and quadratic terms.

General Boltzmann machines are therefore graphical models used for approximating the joint distribution of dependent variables. The corresponding graph contains nodes referred to as visible nodes (or input variables), and non-visible nodes called hidden nodes (or latent variables). General Boltzmann Machines were developed to represent and solve certain combinatorial problems, and can be used as a probabilistic machine learning tool. The applications of General Boltzmann Machines include but are not limited to visual object and speech recognition, classification, regression tasks, dimensionality reduction, information retrieval, and image reconstruction. For an overview of General Boltzmann Machines, see D. Ackley, G. Hinton, T. Sejnowski, "*A Learning Algorithm for Boltzmann Machines*," Cognitive Science 9, 147-169 (1985).

The distribution approximation in General Boltzmann Machines is performed by encoding the dependent variables of interest as nodes of a larger graph. These nodes are the visible nodes and all the other nodes are the hidden nodes. There is a weight and a bias assigned to respectively every edge and vertex in the graph, and an energy function is assigned to the graph that depends on these weights and biases.

General Boltzmann machines with arbitrary connections have not proven to be especially useful in a machine learning sense. This is due to the approximate learning method being slow. When certain restrictions are made on the connection between hidden nodes, the general Boltzmann machines neural network becomes more easily trained and useful for machine learning tasks. When no connections are allowed between hidden nodes and no connections are allowed between visible nodes, the resulting neural network is called a restricted Boltzmann machine (RBM), consisting only of one visible layer and one hidden layer.

With no intra-visible or intra-hidden node connections, efficient training algorithms have been developed that make restricted Boltzmann machines good performers in areas of machine learning through ease in learning probability distributions over a set of inputs on the visible layer. For applications, algorithms, and theory, see section 6 of Y. Bengio et al, "Representation Learning: A Review and New Perspectives, arXiv 2014—(http://www.cl.uni-heidelberg.de/courses/ws14/deepl/BengioETAL12.pdf)

The idea of the Restricted Boltzmann Machine has been pluralized in order to create more effective neural networks called deep Belief networks (DBN). deep Belief networks are created by stacking restricted Boltzmann machines on top of each other such that the hidden layer of the first restricted Boltzmann machine is used as the visible layer to the second restricted Boltzmann machine, the hidden layer of the second acts as the visible layer to the third restricted Boltzmann machine, and so on. This structure is studied extensively and is the basis of deep learning. The advantage of this structure is that the network weights and biases can be trained restricted Boltzmann machine by restricted Boltzmann machine, from the top down, using the same training algorithms developed for stand-alone restricted Boltzmann Machines. For applications, algorithms, and theory behind Deep Belief Networks, see: http://neuralnetworksanddeeplearning.com/chap6.html The Restricted Boltzmann Machine by Restricted Boltzmann Machine approach to training a deep Belief networks comes at the cost of accumulating errors which arise from approximations of distribution for each restricted Boltzmann machine. An alternative approach of training this neural network is by treating it as a general Boltzmann machine and update all the weights at the same iteration rather than layer by layer. This method applied to this structure is called deep Boltzmann machine (DBM).

Quantum Processors

A quantum processor is a quantum mechanical system of a plurality of qubits, measurements over which will result samples from the Boltzmann distribution defined by the global energy of the system.

Qubits are physical implementation of a quantum mechanical system represented on a Hilbert space and realizing at least two distinct and distinguishable eigenstates that represent two states of a quantum bit. A quantum bit is the analogue of the digital bit, where the ambient storing device may store two states $|0\rangle$ and $|1\rangle$ of a two-state quantum information, but also in superpositions $\alpha|0\rangle + \beta|1\rangle$ of the two states. In various embodiments, such systems may have more than two eigenstates in which case the additional eigenstates are used to represent the two logical states by degenerate measurements. Various embodiments of implementations of qubits have been proposed: e.g., solid-state nuclear spins, measured and controlled electronically or with nuclear magnetic resonance, trapped ions, atoms in optical cavities (cavity quantum-electrodynamics), liquid state nuclear spins, electronic charge or spin degrees of freedom in quantum dots, superconducting quantum circuits based on Josephson junctions [Barone and Paterno, 1982, *Physics and Applications of the Josephson Effect*, John Wiley and Sons, New York; Martinis et al., 2002, Physical Review Letters 89, 117901], and electrons on Helium.

To each qubit is inductively coupled a source of bias called a local field bias. In one embodiment a bias source is an electromagnetic device used to thread a magnetic flux through the qubit to provide control of the state of the qubit [US Patent Appl. Publ. No. 2006/0225165].

The local field biases on the qubits are programmable and controllable. In one embodiment, a qubit control system comprising a digital processing unit is connected to the system of qubits and is capable of programming and tuning the local field biases on the qubits.

A quantum processor may furthermore comprise of a plurality of couplings between a plurality of pairs of the plurality of qubits. A coupling between two qubits is a device in proximity of both qubits threading a magnetic flux to both qubits. In one embodiment, a coupling may consist of a superconducting circuit interrupted by a compound Josephson junction. A magnetic flux may thread the compound Josephson junction and consequently thread a magnetic flux on both qubits [US 2006/0225165]. The strength of this magnetic flux contributes quadratically to the energies of the quantum processor. In one embodiment the coupling strength is enforced by tuning the coupling device in proximity of both qubits.

The coupling strengths are controllable and programmable. In one embodiment, a quantum device control system comprising of a digital processing unit is connected to the plurality of couplings and is capable of programming the coupling strengths of the quantum processor.

A quantum annealer is a quantum processor that carries quantum annealing as described, for example, in Farhi, E. et al., "Quantum Adiabatic Evolution Algorithms versus Simulated Annealing" arXiv.org: quant ph/0201031 (2002), pp. 1-16.

Quantum annealers perform a transformation of the quantum processor from an initial setup to a final one. The initial and final setups of the quantum processor provide quantum systems described by their corresponding initial and final Hamiltonians. For a quantum annealer with local field biases and couplings as described above a final Hamiltonian can be expressed as a quadratic function $f(x)=\Sigma_i h_i x_i + \Sigma_{(i,j)} J_{(i,j)} x_i x_j$ where the first summation runs over an index i representing the qubits of the quantum annealer and the second summation is over pairs (i,j) for which there is a coupling between qubits i and j.

A quadratic function as described above in which each variable $x_i$ takes one of the spin values −1 and 1 of the i-th qubit is also called an Ising model. In this case the Ising model is also denoted by $\Sigma_i h_i \sigma_i^z + \Sigma_{i,j} J_{i,j} \sigma_i^z \sigma_j^z$. Here the superscript z indicates that the spins $\sigma_i$ of the qubit i only contributes in one of its three axis. This axis z is therefore also called the measurement axis, or the measurement bases.

In more general embodiments, the Hamiltonian of an Ising model may moreover contain contributions of the spins of the qubits in other bases. For example, the Hamiltonian $\Sigma_i \Gamma_i \sigma_i^x + \Sigma_i h_i \sigma_i^z + \Sigma_{i,j} J_{i,j} \sigma_i^z \sigma_j^z$ is called a transverse field Ising model, in which each spin is affected by a nonzero transverse field along the x axis.

Quantum annealers can be used as heuristic optimizers of their energy function. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14 16, 2013 (http://www.cs.amherst.edu/ccm/cf14-mcgeoch.pdf) and also disclosed in the Patent Application US 2006/0225165.

With minor modifications to the quantum annealing process, quantum processors can instead be used to provide samples form the Boltzmann distribution of their Ising model in a finite temperature. The reader is referred to the technical report: Bian, Z., Chudak, F., Macready, W. G. and Rose, G. (2010), "The Ising model: teaching an old problem new tricks", and also Amin, M. H., Andriyash, E., Rolfe, J., Kulchytskyy, B., and Melko, R. (2016), "Quantum Boltzmann Machine" arXiv:1601.02036.

This method of sampling is called quantum sampling.

For a quantum processor with local field biases and couplings, quantum sampling provides samples from a distribution that is slightly different from the Boltzmann distribution of the Ising model it represents.

The reference Amin, M. H., Andriyash, E., Rolfe, J., Kulchytskyy, B., and Melko, R. (2016), "Quantum Boltzmann Machine" arXiv:1601.02036 studies how far quantum sampling is from Boltzmann sampling.

Optical Computing Devices

Another embodiment of an analog system capable of performing sampling from Boltzmann distribution of an Ising model near its equilibrium state is an optical device.

In one embodiment, the optical device comprises a network of optical parametric oscillators (OPOs) as disclosed in the patent application publications US 2016/0162798 and WO 2015006494 A1.

In this embodiment, each spin of the Ising model is simulated by an optical parametric oscillator operating at degeneracy.

Degenerate optical parametric oscillators are open dissipative systems that experience second order phase transition at the oscillation threshold. Because of the phase-sensitive amplification, a degenerate optical parametric oscillator could oscillate with a phase of either 0 or π with respect to the pump phase for amplitudes above the threshold. The phase is random, affected by the quantum noise associated in optical parametric down conversion during the oscillation build-up. Therefore, a degenerate optical parametric oscillator naturally represents a binary digit specified by its output phase. Based on this property, a degenerate optical parametric oscillator system may be utilized as an Ising machine. The phase of each degenerate optical parametric oscillator is identified as an Ising spin, with its amplitude and phase determined by the strength and the sign of the Ising coupling between relevant spins.

When pumped by a strong source, a degenerate optical parametric oscillator takes one of two phase states corresponding to spin 1 or −1 in the Ising model. A network of N substantially identical optical parametric oscillators with mutual coupling are pumped with the same source to simulate an Ising spin system. After a transient period from introduction of the pump, the network of optical parametric oscillators approaches to a steady state close to its thermal equilibrium.

The phase state selection process depends on the vacuum fluctuations and mutual coupling of the optical parametric oscillators. In some implementations, the pump is pulsed at a constant amplitude, in other implementations the pump output is gradually increased, and in yet further implementations, the pump is controlled in other ways.

In one embodiment of an optical device, the plurality of couplings of the Ising model are simulated by a plurality of configurable couplings used for coupling the optical fields between the optical parametric oscillators. The configurable couplings may be configured to be off, or configured to be on. Turning the couplings on and off may be performed gradually or abruptly. When configured to be on, the configuration may provide any phase or amplitude depending on the coupling strengths of the Ising problem.

Each optical parametric oscillator output is interfered with a phase reference and the result is captured at a photodetector. The optical parametric oscillator outputs represent a configuration of the Ising model. For example, a zero phase may represent a −1 spin state, and a π phase may represent a 1 spin state in the Ising model.

For an Ising model with N spins, and according to one embodiment, a resonant cavity of the plurality of optical parametric oscillators is configured to have a round-trip time equal to N times the period of N pulses from a pump source. Round-trip time as used herein indicates the time for light to propagate along one pass of a described recursive path. The N pulses of a pulse train with period P equal to 1/N of the resonator cavity round-trip time may propagate through the N optical parametric oscillators concurrently without interfering with each other.

In one embodiment, the couplings of the optical parametric oscillators are provided by a plurality of delay lines allocated along the resonator cavity.

The plurality of delay lines, comprise a plurality of modulators which synchronously control the strengths and phases of couplings, allowing for programming of the optical device to simulate the Ising model.

In a network of N optical parametric oscillators, N−1 delay lines and corresponding modulators is enough to control amplitude and phase of coupling between every two optical parametric oscillators.

In one embodiment, an optimal device, capable of sampling from an Ising model can be manufactured as a network of optical parametric oscillators as disclosed in US Patent Application 20160162798.

In one embodiment, the network of optical parametric oscillators and couplings of the optical parametric oscillators can be achieved using commercially available mode locked lasers and optical elements such as telecom fiber delay lines, modulators, and other optical devices. Alternatively, the network of optical parametric oscillators and the couplings of the optical parametric oscillators can be implemented using optical fiber technologies, such as fiber technologies developed for telecommunications applications. The couplings can be realized with fibers and controlled by optical Kerr shutters.

Q-Learning

Methods for approximating the optimal value function $U^*$ and optimal policy $\alpha^*$ are called Neurodynamic Programming or Q-Learning algorithms. The reference [Sallans, B., Hinton, G. E., Reinforcement Learning with Factored States and Actions, Journal of Machine Learning Research 5, 1063-1088, 2004] proposes methods for Q-learning through usage of Boltzmann machines. In particular General Boltzmann Machines are used to approximate the joint distribution of states and actions in the optimal stochastic control setup.

Features of the invention will be apparent from review of the disclosure, drawings, and description of the invention below.

BRIEF SUMMARY

According to a broad aspect, there is disclosed a method for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the method comprising using a sampling device coupled to a digital computer and to a sampling device control system, the sampling device obtaining data representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers, and a transverse field strength; obtaining, using the digital computer, initialization data comprising the set of actions, the set of states, the reward structure of the stochastic control problem and an initial policy for the stochastic control problem, the policy comprising a choice of at least one action for each state; using the digital computer and the sampling device control system, assigning data representative of an initial weight and a bias of respectively each coupler and each node and the transverse field strength of the Boltzmann machine to the sampling device; until a stopping criterion is met generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, obtaining, using the digital computer, a future-epoch state-action pair, wherein the state is obtained through a stochastic state process, and further wherein the obtaining of the action comprises performing a stochastic optimization test on the plurality of all state-action pairs comprising the future-epoch state and any possible action to thereby provide the action at the future-epoch and update the policy for the future-epoch state; amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure, and providing the policy using the digital computer when the stopping criterion is met.

According to an embodiment, the sampling device comprises a quantum processor and wherein the sampling device control system comprises a quantum device control system and the quantum processor is coupled to the digital computer and to the quantum device control system, further wherein the quantum processor comprises a plurality of qubits and a plurality of couplers, each coupler for providing a communicative coupling at a crossing of two qubits.

According to an embodiment, the sampling device comprises an optical device configured to receive energy from an optical energy source and generate a plurality of optical parametric oscillators, and a plurality of coupling devices, each of which controllably couples an optical parametric oscillator of the plurality of optical parametric oscillators.

According to an embodiment, the sampling device comprises a central processing unit and a memory unit coupled to the central processing unit and implementing the Boltzmann machine and the Boltzmann machine implemented is a classical Boltzmann machine characterized by a zero value transverse field strength; further wherein the memory unit comprises an application for obtaining data representative of each weight and each bias of respectively each coupler and each node of the classical Boltzmann machine and the application is adapted for performing a simulated quantum annealing of the classical Boltzmann machine.

According to an embodiment, the sampling device comprises a central processing unit and a memory unit coupled to the central processing unit and is implementing the Boltzmann machine and the Boltzmann machine implemented is a quantum Boltzmann machine characterized by a non-zero value transverse field strength and the memory unit comprises an application for obtaining data representative of each weight and each bias of respectively each coupler and each node of the quantum Boltzmann machine; further wherein the application is adapted for performing a simulated quantum annealing of the quantum Boltzmann machine.

According to an embodiment, the performing of the simulated quantum annealing of the quantum Boltzmann machine provides a plurality of sample configurations of an effective Hamiltonian representative of the quantum Boltzmann machine.

According to an embodiment, the sampling device comprises a central processing unit and a memory unit coupled to the central processing unit and implementing the Boltzmann machine and the Boltzmann machine implemented is a classical Boltzmann machine characterized by a zero value transverse field strength; further wherein the memory unit comprises an application for obtaining data representative of each weight and each bias of respectively each coupler and each node of the classical Boltzmann machine and the application is adapted for sampling a plurality of instances of a Fortuin-Kasteleyn random cluster representation corresponding to the classical Boltzmann machine to thereby provide an approximation of a number of clusters in the Fortuin-Kasteleyn random cluster representation.

According to an embodiment, the sampling device comprises a central processing unit and a memory unit coupled to the central processing unit and implementing the Boltzmann machine and the Boltzmann machine implemented is a quantum Boltzmann machine characterized by a non-zero value transverse field strength and the memory unit comprises an application for obtaining data representative of each weight and each bias of respectively each coupler and each node of the quantum Boltzmann machine and the application is adapted for sampling a plurality of instances of a Fortuin-Kasteleyn random cluster representation corresponding to the quantum Boltzmann machine to thereby provide an approximation of a number of clusters in the Fortuin-Kasteleyn random cluster representation.

According to an embodiment, the obtaining of the approximation of the value of the Q-function both at the present-epoch and at the future-epoch comprises obtaining from the sampling device a plurality of samples of configurations of the Boltzmann machine along a measurement axis and calculating using the digital computer an empirical approximation of a free energy of the Boltzmann machine.

According to an embodiment, the obtaining of the approximation of the value of the Q-function both at the present-epoch and at the future-epoch comprises obtaining from the sampling device a plurality of sample configurations of the Boltzmann machine along a measurement axis, constructing from the obtained sample configurations a plurality of samples of the configurations of an effective Hamiltonian representative of the quantum Boltzmann machine and using the digital computer calculating an empirical approximation of a free energy of the quantum Boltzmann machine.

According to an embodiment, the obtaining of an approximation of the value of the Q-function both at the present-epoch and at the future-epoch comprises obtaining from the sampling device the plurality of sample of the configurations of the effective Hamiltonian representative of the quantum Boltzmann machine and using the digital computer calculating an empirical approximation of a free energy of the quantum Boltzmann machine.

According to an embodiment, the obtaining of an approximation of the value of the Q-function both at the present-epoch and at the future-epoch comprises obtaining from the sampling device the approximation of the number of clusters in the Fortuin-Kasteleyn random cluster representation corresponding to the quantum Boltzmann machine, and using the digital computer for calculating an empirical approximation of a free energy of the quantum Boltzmann machine.

According to an embodiment, the calculating of both the first and the second empirical means corresponding to the nodes, comprises obtaining from the sampling device a plurality of samples of configurations of one of the quantum and the classical Boltzmann machine along a measurement axis and using the digital computer for calculating an approximation of the empirical means of the nodes.

According to an embodiment, the calculating of both the first and the second empirical means corresponding to the nodes, comprises obtaining from the sampling device the plurality of sample of configurations of the effective Hamiltonian of the Boltzmann machine and using the digital computer for calculating an approximation of the empirical means of the nodes.

According to an embodiment, the performing of the stochastic optimization test on the plurality of all state-action pairs comprises using the digital computer and the sampling device control system, amending data representative of none or at least one coupler and at least one bias using each state-action pair corresponding to the future-epoch state, performing a sampling corresponding to each state-action pair corresponding to the future-epoch state to provide empirical means, obtaining, using the digital computer, an approximation of a value of the Q-function at each state-action pair corresponding to the future-epoch state, using all approximated Q-function values corresponding to each state-action pair corresponding to the future-epoch state, using the digital computer, sample from corresponding distribution to update the policy for the future epoch state.

According to an embodiment, the performing of the stochastic optimization test on the plurality of all state-action pairs comprises obtaining a temperature parameter; obtaining the future-epoch state; sampling a Boltzmann distribution associated with the approximation of the value of the Q-function with a state variable fixed at the future-epoch state and the provided temperature.

According to an embodiment, the plurality of qubits of the quantum processor comprises a first group of qubits; a second group of qubits and the plurality of couplers of the quantum processor comprises at least one coupler, each of the at least one couplers for providing a communicative coupling at a crossing between a qubit of the first group of qubits and at least one qubit of the second group of qubits, and a plurality of couplers, each of the plurality of couplers for providing a communicative coupling at a crossing between a qubit in the second group of qubits and other qubit in the second group of qubits.

According to an embodiment, the first group of qubits represents the set of actions of the stochastic control problem.

According to an embodiment, the amending of data representative of none or at least one coupler and the at least one bias using the generated present-epoch state-action pair, comprises switching all couplers providing a communicative coupling at a crossing between a qubit of the first group of qubits and the second group of qubits OFF, and amending at least one bias in the second group of qubits using the generated present-epoch state-action pair.

According to an embodiment, the amending of data representative of none or at least one coupler and the at least one bias using the generated future-epoch state-action pair comprises switching all couplers providing a communicative coupling at a crossing between a qubit of the first group of qubits and the second group of qubits OFF, and amending at least one bias in the second group of qubits using the generated future-epoch state-action pair.

According to an embodiment, the performing of the stochastic optimization test on the plurality of all state-action pairs comprising the future-epoch state and any possible action comprises switching all couplers providing a communicative coupling at a crossing between a qubit of the first group of qubits and the qubits of the second group of qubits ON; amending at least one bias in the second group of qubits using the future-epoch state corresponding to the future-epoch state-action pair; performing a quantum sampling to obtain empirical means corresponding to the first group of qubits and updating, using the digital computer, the policy for the future-epoch state by assigning to the future-epoch state an action according to a distribution of the obtained empirical means corresponding to the first group of qubits.

According to an embodiment, the stopping criterion comprises reaching a maximum number of training steps.

According to an embodiment, the stopping criterion comprises reaching a maximum runtime.

According to an embodiment, the stopping criterion comprises convergences of a function of the weights and biases of the couplings and local fields.

According to an embodiment, the stopping criterion comprises convergence of the policy to a fixed policy.

According to an embodiment, the providing of the policy comprises at least one of displaying the policy to a user interacting with the digital computer; storing the policy in the digital computer and transmitting the policy to another processing unit operatively connected to the digital computer.

According to an embodiment, the digital computer comprises a memory unit; further wherein the initialization data is obtained from the memory unit of the digital computer.

According to an embodiment, the initialization data is obtained from one of a user interacting with the digital computer and a remote processing unit operatively connected with the digital computer.

According to a broad aspect, there is disclosed a digital computer comprising a central processing unit; a display device; a communication port for operatively connecting the digital computer to a sampling device coupled to a digital computer and to a sampling device control system; a memory unit comprising an application for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the application comprising instructions for using a sampling device coupled to the digital computer and to a sampling device control system, the sampling device obtaining data representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers, and a transverse field strength; instructions for obtaining, using the digital computer, initialization data comprising the set of actions, the set of states, the reward structure of the stochastic control problem and an initial policy for the stochastic control problem, the policy comprising a choice of at least one action for each state; instructions for using the digital computer and the sampling device control system, assigning data representative of an initial weight and a bias of respectively each coupler and each node and the transverse field strength of the Boltzmann machine to the sampling device; instructions for, until a stopping criterion is met generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, obtaining, using the digital computer, a future-epoch state-action pair, wherein the state is obtained through a stochastic state process, and further wherein the obtaining of the action comprises performing a stochastic optimization test on the plurality of all state-action pairs comprising the future-epoch state and any possible action to thereby provide the action at the future-epoch and update the policy for the future-epoch state; amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure, and instructions for providing the policy using the digital computer when the stopping criterion is met.

According to a broad aspect, there is disclosed a non-transitory computer readable storage medium for storing computer-executable instructions which, when executed, cause a digital computer to perform a method for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the method comprising using a sampling device coupled to a digital computer and to a sampling device control system, the sampling device obtaining data representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers, and a transverse field strength; obtaining, using the digital computer, initialization data comprising the set of actions, the set of states, the reward structure of the stochastic control problem and an initial policy for the stochastic control problem, the policy comprising a choice of at least one action for each state; using the digital computer and the sampling device control system, assigning data representative of an initial weight and a bias of respectively each coupler and each node and the transverse field strength of the Boltzmann machine to the sampling device; until a stopping criterion is met generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, obtaining, using the digital computer, a future-epoch state-action pair, wherein the state is obtained through a stochastic state process, and further wherein the obtaining of the action comprises performing a stochastic optimization test on the plurality of all state-action pairs comprising the future-epoch state and any possible action to thereby provide the action at the future-epoch and update the policy for the future-epoch state; amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure, and providing the policy using the digital computer when the stopping criterion is met.

An advantage of the method disclosed herein is that it overcomes the curse of dimensionality of the value iteration method for solving Markov Decision problems.

Another advantage of the method disclosed herein is that it overcomes the memory storage problem of the common Q-learning methods for solving Markov Decision problems.

Another advantage of the method disclosed herein is that quantum sampling is used to provide an efficient method for finding empirical means of the qubits of the system to thereby provide an efficient method for training the Neural Network.

Another advantage of the method disclosed herein is that sampling from a Fortuin-Kasteleyn random cluster representation is used in one embodiment to provide an efficient method for finding empirical means of the qubits of the system to thereby provide an efficient method for training the Neural Network.

Another advantage of the method disclosed herein is that it is not restricted to specific graphical layout of the qubits of a quantum processor or an optical device.

BRIEF DESCRIPTION OF THE DRAWINGS

In order that the invention may be readily understood, embodiments of the invention are illustrated by way of example in the accompanying drawings.

Figure 1:
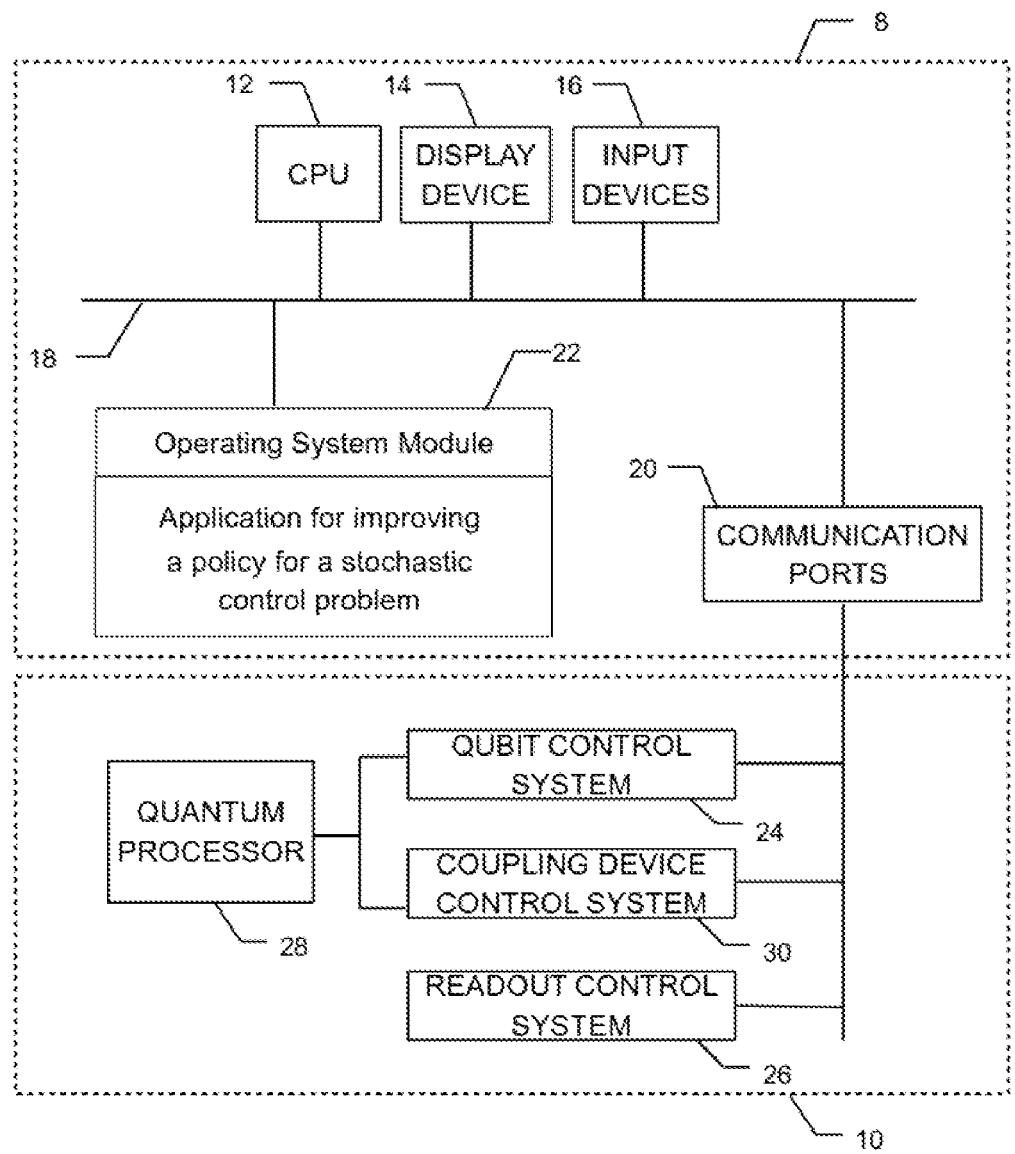
FIG. 1 is a diagram that shows an embodiment of a system comprising a digital system coupled to an analog computer.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an," "the" and "at least one" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

In one embodiment, the term "analog computer" refers to a system comprising a quantum processor, control systems of qubits, coupling devices, and a readout system, all connected to each other through a communication bus.

In an alternative embodiment, the "analog computer" refers to a system comprising an optical device comprising a network of optical parametric oscillators, control systems of the optical parametric oscillators; one or a plurality of coupling devices comprising delay lines and modulators, and a readout system comprising one or a plurality of photodetectors.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways. In this specification, these implementations, or any other form that the invention may take, may be referred to as systems or techniques. A component such as a processor or a memory described as being configured to perform a task includes either a general component that is temporarily configured to perform the task at a given time or a specific component that is manufactured to perform the task.

With all this in mind, the present invention is directed to a method and a system for improving a policy for a stochastic control problem.

As mentioned above, the stochastic control problem may be of various types. In one embodiment, the stochastic control problem is portfolio optimization in finance and investment.

In an alternative embodiment, the stochastic control problem is the equipment replacement problem.

In an alternative embodiment, the stochastic control problem is the scheduling in queue theory and operations research.

In an alternative embodiment, the stochastic control problem is a problem involving generating sports strategies.

Now referring to FIG. 1, there is shown a diagram that shows an embodiment of a system which may be used for implementing a method for improving a policy for a stochastic control problem.

It will be appreciated that, in the embodiment disclosed in FIG. 1, a quantum processor is used.

It will be appreciated that alternatively, other sampling devices may be used, such as simulators of quantum or classical Ising models or optical devices comprising networks of optical parametric oscillators.

More precisely, the system comprises a digital system 8 coupled to an analog computer 10.

It will be appreciated that the digital computer 8 may be any type of digital computer.

In one embodiment, the digital computer 8 is selected from a group consisting of desktop computers, laptop computers, tablet PC's, servers, smartphones, etc. It will also be appreciated that, in the foregoing, the digital computer 8 may also be broadly referred to as a processor.

In the embodiment shown in FIG. 1, the digital computer 8 comprises a central processing unit 12, also referred to as a microprocessor, a display device 14, input devices 16, communication ports 20, a data bus 18 and a memory unit 22.

The central processing unit 12 is used for processing computer instructions. The skilled addressee will appreciate that various embodiments of the central processing unit 12 may be provided.

In one embodiment, the central processing unit 12 comprises a CPU Core i5 3210 running at 2.5 GHz and manufactured by Intel™.

The display device 14 is used for displaying data to a user. The skilled addressee will appreciate that various types of display device 14 may be used.

In one embodiment, the display device 14 is a standard liquid crystal display (LCD) monitor.

The input devices 16 are used for inputting data into the digital computer 8.

The communication ports 20 are used for sharing data with the digital computer 8.

The communication ports 20 may comprise, for instance, universal serial bus (USB) ports for connecting a keyboard and a mouse to the digital computer 8.

The communication ports 20 may further comprise a data network communication port such as IEEE 802.3 port for enabling a connection of the digital computer 8 with an analog computer 10.

The skilled addressee will appreciate that various alternative embodiments of the communication ports 20 may be provided.

The memory unit 22 is used for storing computer-executable instructions.

The memory unit 22 may comprise a system memory such as a high-speed random access memory (RAM) for storing system control program (e.g., BIOS, operating system module, applications, etc.) and a read-only memory (ROM).

It will be appreciated that the memory unit 22 comprises, in one embodiment, an operating system module.

It will be appreciated that the operating system module may be of various types.

In one embodiment, the operating system module is OS X Yosemite manufactured by Apple™.

The memory unit 22 further comprises an application for improving a policy for a stochastic control problem.

The memory unit 22 may further comprise an application for using the analog computer 10.

The memory unit 22 may further comprise quantum processor data such as a corresponding weight for each coupler of the quantum processor 28 and a corresponding bias for each qubit of the quantum processor 28.

The analog computer 10 comprises a qubit control system 24, a readout control system 26, a quantum processor 28, and a coupling device control system 30.

The quantum processor 28 may be of various types. In one embodiment, the quantum processor comprises superconducting qubits.

The readout control system 26 is used for reading the qubits of the quantum processor 28. In fact, it will be appreciated that in order for a quantum processor to be used in the method disclosed herein, a readout system that measures the qubits of the quantum system in their quantum mechanical states is required. Multiple measurements provide a sample of the states of the qubits. The results from the readings are fed to the digital computer 8. The biases of the qubits of the quantum processor 28 are controlled via the qubit control system 24. The couplers are controlled via the coupling device control system 30.

It will be appreciated that the readout control system 26 may be of various types. For instance, the readout control system 26 may comprise a plurality of dc-SQUID magnetometers, each inductively connected to a different qubit of the quantum processor 28. The readout control system 26 may provide voltage or current values. In one embodiment, the dc-SQUID magnetometer comprises a loop of superconducting material interrupted by at least one Josephson junction, as is well known in the art.

The coupling device control system 30 may comprise one or more coupling controllers for the coupling devices, also referred to as "couplers." Each coupling controller may be configured to tune the coupling weight of a corresponding coupling device from zero to a maximum value. It will be appreciated that the coupling devices may be tuned, for instance, to provide ferromagnetic or antiferromagnetic coupling between the qubits of the quantum processor 28. An example of such analog computer is disclosed in U.S. Pat. No. 8,421,053, and in U.S. Patent Application Publication No. 2015/0046681.

In the embodiment of FIG. 1, the sampling device coupled to the digital computer is a quantum processor.

In an alternative embodiment, the sampling device is an optical device comprising a network of optical parametric oscillators.

In a third embodiment, the sampling device comprises a central processing unit and a memory unit coupled to the central processing unit, the memory unit comprising an application for obtaining data representative of transverse field strength and of each weight and each bias of respectively each coupler and each node of a Boltzmann machine, wherein zero value transverse field strength corresponds to a classical Boltzmann machine and non-zero value transverse field strength corresponds to a quantum Boltzmann machine (QBM) and for performing a simulated quantum annealing method of the Boltzmann machine to thereby provide a plurality of sample configurations of the Boltzmann machine along a measurement axis.

In a fourth embodiment, the sampling device comprises a central processing unit and a memory unit coupled to the central processing unit, the memory unit comprising an application for obtaining from the digital computer data representative of transverse field strength and of each weight and each bias of respectively each coupler and each node of a Boltzmann machine, wherein transverse field strength has a non-zero value corresponding to a quantum Boltzmann machine and for performing a simulated quantum annealing method on the quantum Boltzmann machine to thereby provide a plurality of sample configurations of an effective Hamiltonian representative of the quantum Boltzmann machine.

In a fifth embodiment, the sampling device comprises a central processing unit and a memory unit coupled to the central processing unit, the memory unit comprising an application for obtaining from the digital computer data representative of transverse field strength and of each weight and each bias of respectively each coupler and each node of a Boltzmann machine, wherein transverse field strength has a non-zero value corresponding to a quantum Boltzmann machine, and for sampling a plurality of instances of a Fortuin-Kasteleyn random cluster representation corresponding to the quantum Boltzmann machine to thereby provide an approximation of a number of clusters in the Fortuin-Kasteleyn random cluster representation.

Figure 2:
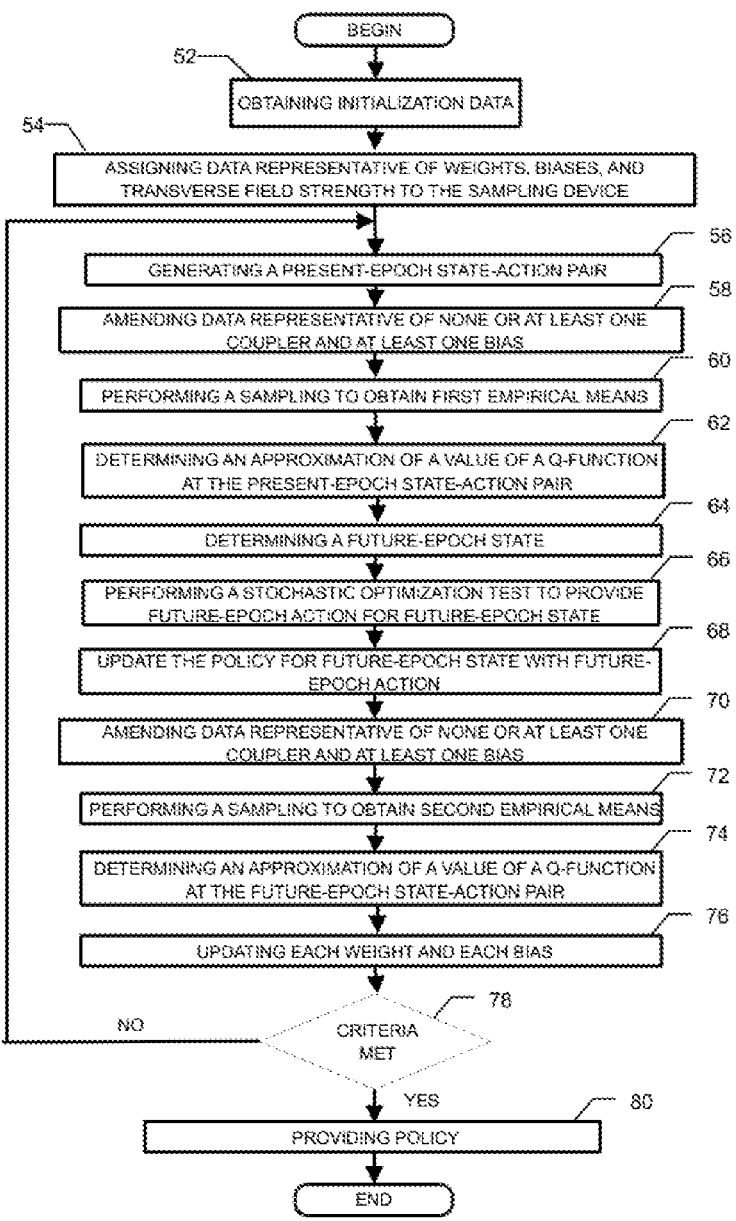
FIG. 2 is a flowchart which shows an embodiment of a method for improving a policy for a stochastic control problem.

Now referring to FIG. 2, there is shown an embodiment of a method for improving a policy for a stochastic control problem.

As explained above, the stochastic control problem is characterized by a set of actions, a set of states, a discount factor, a reward structure as a function of states and actions, and a plurality of decision epochs wherein evolution of an underlying stochastic state process depends on a plurality of actions in a policy.

A sampling device is used. More precisely, a sampling device coupled to a digital computer and to a sampling device control system is used for obtaining data. The data obtained is representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers and a transverse field strength.

According to processing step 52, initialization data are obtained. It will be appreciated that the initialization data may be obtained using the digital computer 8. It will be further appreciated that the initialization data comprise the set of actions, the set of states, the discount factor, the reward structure of the stochastic control problem, and an initial policy for the stochastic control problem, the policy comprising a choice of at least one action for each state.

It will be appreciated that in one embodiment the initialization data may be stored in the memory unit 22 of the digital computer 8.

In an alternative embodiment, the initialization data may be provided by a user interacting with the digital computer 8.

In another alternative embodiment, the initialization data may be obtained from a remote processing unit operatively coupled with the digital computer 8.

Still referring to FIG. 2 and according to processing step 54, data representative of an initial weight and a bias of respectively each coupler and each node and a transverse field strength of the Boltzmann machine are assigned to the sampling device. In the embodiment where the sampling device comprises a quantum processor, data representative of the initial weights and biases are assigned to respectively each coupler and each qubit of the quantum processor and the value of transverse field strength is assigned using the control system.

In the embodiment where the sampling device comprises a network of optical parametric oscillator pulses, data representative of the initial weights and biases representative are communicated to the energy source and modulators. In the embodiment where the sampling device comprises a simulated quantum annealing application, the initial weight and the bias data representative are passed to an application as parameters.

It will be appreciated that the quantum processor may be of various types.

In one embodiment, the quantum processor comprises a first group of qubits and a second group of qubits. In this embodiment, the quantum processor comprises a group of couplers. The group of couplers of this quantum processor comprises at least one coupler, each of the at least one coupler for providing a communicative coupling at a crossing between a qubit of the first group of qubits and at least one qubit of the second group of qubits. The group of couplers further comprises a plurality of couplers, each of the plurality of couplers for providing a communicative coupling at a crossing between a qubit in the second group of qubits and other qubit in the second group of qubits.

In this embodiment, the first group of qubits is used for the set of actions of the stochastic control problem.

In another embodiment, the quantum processor is D-Wave 2X System manufactured by D-Wave Systems, Ltd.

It will be appreciated that the initial weights and the biases of respectively each coupler and each qubit of the quantum processor may be assigned using the digital computer 8 and the quantum device control system.

The device control system comprises the qubit control system 24 and the coupling device control system 30.

It will be appreciated that the initial weights and biases may be stored in the memory unit 22 of the digital computer 8.

In an alternative embodiment, the initial weights and the biases are provided by a user interacting with the digital computer 8.

In a further embodiment, the initial weights and the biases are provided by a remote processing unit operatively coupled with the digital computer 8.

It will be appreciated that in one embodiment, the initial weights and the biases are generated randomly.

Setting Up the Sampling Devices

In an embodiment wherein a quantum processor is used as sampling device, it will be appreciated that the qubits of the quantum processor are representative of a plurality of nodes of a corresponding General Boltzmann Machine (GBM).

In the embodiment wherein the sampling device comprises an optical device, the network of optical parametric oscillators is representative of the general Boltzmann machine.

The visible nodes of the general Boltzmann machine are comprised of two groups of nodes. A first group of nodes represents the states of the stochastic control problem. A second group of nodes represents the action of the stochastic control problem. The hidden nodes of the general Boltzmann machine are comprised of all the nodes that are not contained in the first or second group of nodes.

In one embodiment wherein a quantum processor is used as sampling device, the quantum processor comprises a plurality of qubits representative of the hidden nodes of the general Boltzmann machine. In this embodiment, the quantum processor comprises a plurality of qubits and a plurality of couplers, each coupler for providing a communicative coupling at a crossing between two qubits.

In the embodiment wherein an optical device is used as sampling device, the optical oscillators are representative of the hidden nodes of the general Boltzmann machine.

In another embodiment wherein a simulated quantum annealing is used as sampling device, the simulated spins are representative of the hidden nodes of the general Boltzmann machine.

In another embodiment, wherein a simulated quantum annealing is used as sampling device, a first group of simulated spins is representative of the action nodes of the general Boltzmann machine and a second group of simulated spins of the quantum processor is representative of the hidden nodes of the general Boltzmann machine.

In another embodiment wherein a quantum processor is used as a sampling device, a first group of qubits of the quantum processor is representative of the action nodes of the General Boltzmann Machine and a second group of qubits of the quantum processor is representative of the hidden nodes of the general Boltzmann machine. In this embodiment, the quantum processor comprises a group of couplers. The group of couplers of this quantum processor comprises at least one coupler, each of the at least one coupler for providing a communicative coupling at a crossing between a qubit of the first group of qubits and at least one qubit of the second group of qubits. The group of couplers further comprises a plurality of couplers, each of the plurality of couplers for providing a communicative coupling at a crossing between a qubit in the second group of qubits and other qubit in the second group of qubits. In this embodiment, the first group of qubits are used for the set of actions of the stochastic control problem and the second group of qubits are used for the set of hidden nodes of general Boltzmann machine.

Each node of the General Boltzmann Machine takes values in $\{0,1\}$ unless it is used for the set of states or actions of the stochastic control problem.

The plurality of nodes of the general Boltzmann machine used to represent the set of states and actions of the stochastic control problem may take values in $\{0, 1\}$ or a finite or infinite set of discrete values, or real numbers represented by float data types.

In an embodiment wherein a quantum processor is used as sampling device, an ON coupling between any two qubits is considered as a weight between the two corresponding nodes of the General Boltzmann Machine.

In the same embodiment, each ON coupling has a float-valued strength that is an approximation of the corresponding weight. A non-zero weight between two nodes indicates connectivity of the nodes.

Still in the same embodiment, each OFF coupling has an effectively zero valued strength and is an indication of a disconnection between any two nodes in the general Boltzmann machine.

Training

According to processing step 56, a present-epoch state-action pair is generated.

It will be appreciated that the present-epoch state-action pair is comprised of a state and a corresponding action.

In one embodiment, the present-epoch state-action pair is generated randomly using the digital computer 8.

In an alternative embodiment, the present-epoch state-action pair is generated from the environment.

According to processing step 58, the data representative of none or at least one coupler and at least one bias are amended using the generated present-epoch state-action pair. It will be appreciated that the data representative of none or at least one coupler and at least one bias are amended using the digital computer 8.

In the case where the sampling device comprises the quantum processor, if any of the qubits of the quantum processor represent action nodes, this processing step comprises switching every coupling between any qubit representative of an action node and any other qubit OFF. Then biases of the qubits corresponding to those hidden nodes of the general Boltzmann machine connected to visible nodes are updated using the generated present-epoch state-action pair.

In the case where the sampling device comprises the simulated quantum annealing application, if any of the spins of the simulated quantum annealing application represent action nodes, this processing step comprises setting weight between any spin representative of an action node and any other spin to zero. Then biases of the spins corresponding to those hidden nodes of the General Boltzmann Machine connected to visible nodes are updated using the generated present-epoch state-action pair.

If the present-epoch state-action pair is represented by a vector v=(s, a) on the visible nodes, and the weight connecting state node i to hidden node j connected to it is $w_{ij}$ then the bias on the hidden node j is amended by adding $w_{ij}s_i$ to it. If the weight connecting action node k to a hidden node j connected to it is $w_{kj}$ then the bias on the hidden node j is amended by adding $w_{kj}a_k$ to it.

In the case where the sampling device comprises an optical device data representative of the weights and biases representative amended as described above are communicated to the energy source and modulators.

In the embodiment wherein the sampling device comprises the quantum processor, it will be appreciated that the couplings and biases of the quantum processor are amended using the digital computer 8 and the quantum device control system comprising the qubit control system 24 and the coupling device control system 30.

According to processing step 60, a sampling is performed. It will be appreciated that in the case where the sampling device comprises the quantum processor or an optical device, the sampling is quantum by the nature of these devices.

It will be appreciated that the sampling corresponding to the present-epoch state-action pair is performed to obtain first sampling empirical means.

In the case where the sampling device comprises a quantum processor, the sampling corresponding to the present-epoch state-action pair is performed to obtain first quantum sampling empirical means corresponding to the qubits of the quantum processor.

In the case where the sampling device comprises an optical device, the sampling corresponding to the present-epoch state-action pair is performed to obtain first sampling empirical means corresponding to the optical parametric oscillators of the optical device.

More precisely the first sampling empirical means comprises three pluralities of values.

The first plurality of values are the averages of the states each qubit corresponding to a hidden node is measured at in quantum sampling in the case where the sampling device comprises a quantum processor. In the case where the sampling device comprises an optical device, the first plurality of values are the averages of the spins corresponding to the measurements of the phases of the optical parametric oscillators. In the case where the sampling device comprises a simulated quantum annealing application, the first plurality of values are the averages of the values of spins. It will be appreciated by the skilled addressee that for the hidden node j this value may be denoted by $\langle h_j \rangle_v$ where v=(s, a) is the vector representative of the visible nodes corresponding to the present-epoch state-action pair.

The second plurality of values are the averages of the product of the states each pair of qubit corresponding to a pair of hidden nodes is measured at in quantum sampling in the case where the sampling device comprises a quantum processor. In the case where the sampling device comprises an optical device, the second plurality of values are the averages of the product of the values of spins corresponding to the measurements of the phases of the optical parametric oscillators. In the case where the sampling device comprises a simulated quantum annealing application, the second plurality of values are the averages of the products of values of spins. It will be appreciated by the skilled addressee that for the pair of hidden nodes j and k this value may be denoted by $\langle h_j h_k \rangle_v$.

In the case where the sampling device comprises a quantum processor, the third plurality of values are the frequencies of occurrences of each configuration of the qubits of the quantum processor denoted by $\mathbb{P}(h|v)$ where h is a binary vector representative of the states at which all qubits are measured at in each sample of the quantum sampling.

In the case where the sampling device comprises a simulated quantum annealing application for the classical Boltzmann machine, the third plurality of values are the frequencies of occurrences of each configuration of the spins denoted by $\mathbb{P}(h|v)$ where h is a binary vector representative of the states at which all spins are measured at in each sample of the sampling.

In the case where the sampling device comprises an optical device the third plurality of values are the frequencies of occurrences of each configuration of spins corresponding to the phases of the optical parametric oscillators denoted by $\mathbb{P}(h|v)$ where h is a binary vector of values of spins corresponding to the measurements of the phases of the optical parametric oscillators at each sample of the sampling.

In the case where the sampling device comprises a quantum processor performing a sampling from the quantum Hamiltonian representative of a quantum Boltzmann machine, the third plurality of values are the frequencies of occurrences of each sample configurations of a classical effective Hamiltonian representative of the quantum Boltzmann machine denoted by $\mathbb{P}(c|v)$ where c is a binary vector representative of the states of all effective spins.

In one embodiment, the quantum Hamiltonian representative of a quantum Boltzmann machine is $$H = -\sum_{1 \leq i < j \leq n} J_{ij} \sigma_i^z \sigma_j^z - \sum_{1 \leq i \leq n} h_i \sigma_i^z - \Gamma \sum_{1 \leq i \leq n} \sigma_i^x$$

with n spins $\sigma_1, \ldots, \sigma_n$.

In a further embodiment, the classical effective Hamiltonian comprises of m replicas of the spins of the quantum Hamiltonian of the quantum Boltzmann machine.

The number m of replicas of the effective classical Hamiltonian corresponding to the quantum Boltzmann machine with transverse field is provided.

In one embodiment, the number m of replicas of the effective classical Ising model is obtained using the digital computer 8, and more precisely using the memory 22 of the digital computer 8.

In an alternative embodiment, the number m of replicas of the effective classical Ising model is provided to the digital computer 8 by a remote processing unit operatively coupled with the digital computer 8.

To each spin $\sigma_i$ is associated m spins denoted as $\sigma_i^1, \ldots, \sigma_i^n$. The bias on every spin $\sigma_i^k$ for $i=1, \ldots, n$ and $k=1, \ldots, m$ is set to $$\frac{h_i}{m}.$$

The coupling between every two spins $\sigma_i^k$ and $\sigma_j^k$ for $1 \leq i \neq j \leq n$ is set to $$\frac{J_{ij}}{m}.$$

For every $k=1, \ldots, m-1$ the coupling between every two spins $\sigma_i^k$ and $\sigma_i^{k+1}$ is set to $$\frac{1}{2\beta}$$

ln coth $$\left(\frac{\beta\Gamma}{m}\right).$$

The effective Hamiltonian of one dimension higher is therefore $$H(\sigma) = -\sum_{\substack{1 \leq i < j \leq n \\ 1 \leq k \leq m}} \frac{J_{ij}}{m} \sigma_i^k \sigma_j^k - \sum_{\substack{1 \leq i \leq n \\ 1 \leq k \leq m}} \frac{h_i}{m} \sigma_i^k - \frac{1}{2\beta} \ln\coth\left(\frac{\beta\Gamma}{m}\right) \sum_{\substack{1 \leq i \leq n \\ 1 \leq k \leq m-1}} \sigma_i^k \sigma_i^{k+1}.$$

In the case where the sampling device comprises a quantum processor performing sampling from the quantum Hamiltonian representative of a quantum Boltzmann machine, the sample configurations of the classical effective Hamiltonian are constructed by attaching measured values of qubits to the effective spins, wherein each measured configuration of qubits corresponds to a replica within the effective Hamiltonian.

In the case where the sampling device comprises a simulated quantum annealing application performing sampling from the quantum Hamiltonian representative of a quantum Boltzmann machine, the third plurality of values are the frequencies of occurrences of each configuration of the effective spins of the effective Hamiltonian denoted by $\mathbb{P}(c|v)$ where c is a binary vector representative of the states of all effective spins.

Still referring to FIG. 2 and according to processing step 62, an approximation of a value of a Q-function is performed.

It will be appreciated that the determination of the approximation of the value of the Q-function is performed at the present-epoch state-action pair using the obtained first sampling empirical means.

It will be appreciated that, in the case where the sampling device comprises a quantum processor, the determination of the approximation of the value of the Q-function is performed at the present-epoch state-action pair using the obtained first quantum sampling empirical means.

It will be further appreciated that the approximation of the value of the Q-function is determined using the digital computer 8.

It will be appreciated by the skilled addressee that the value of the Q-function is representative of a utility of the present-epoch state-action pair.

According to processing step 64, a future-epoch state is obtained. It will be appreciated that the state is obtained through a stochastic state process.

In one embodiment, a future-epoch state is obtained through a stochastic test involving known Markovian transition probabilities. In another embodiment, a future-epoch state is obtained through observations from the environment. In a further embodiment, a future-epoch state is obtained from the provided training data.

It will be appreciated that the future-epoch state is obtained using the digital computer 8.

In one embodiment, the future-epoch state is obtained using the digital computer 8, and more precisely using the memory 22 of the digital computer 8.

In an alternative embodiment, the future-epoch state is provided to the digital computer 8 by a remote processing unit operatively coupled with the digital computer 8.

According to processing step 66, a future-epoch action is obtained. The obtaining of the action comprises performing a stochastic optimization test on the plurality of all state-action pairs comprising the future-epoch state and any possible action to thereby provide the action at the future-epoch.

In one embodiment, the performing of the stochastic optimization test on the plurality of all state-action pairs comprises obtaining a temperature parameter, obtaining the future-epoch state and sampling a Boltzmann distribution associated with the approximation of the value of the Q-function with a state variable fixed at the future-epoch state and the provided temperature.

In one embodiment the Boltzmann distribution is sampled corresponding to the action nodes. In this embodiment for present-epoch state s, and each action $\sigma_i \in A$, the corresponding Q-function is approximated and denoted as $Q_i$. Then the actions $\sigma_i \in A$ are sampled from the distribution $$P(a_i) = \frac{e^{Q_i}}{\sum_j e^{Q_j}}.$$

The resulting action is assumed to be the best action for present-epoch state s.

In another embodiment where the sampling device comprises a quantum processor, where the first group of qubits represents the set of actions of the stochastic control problem and the second group of qubits represents the hidden nodes of the corresponding general Boltzmann machine, the updating of the policy for the present-epoch state may be performed by quantum sampling. In one embodiment, the performing of the stochastic optimization test on the plurality of all state-action pairs comprising the future-epoch state and any possible action comprises switching all couplers providing a communicative coupling at a crossing between a qubit of the first group of qubits and the qubits of the second group of qubits ON, amending at least one bias in the second group of qubits using the future-epoch state corresponding to the future-epoch state-action pair, performing a quantum sampling to obtain empirical means corresponding to the first group of qubits and updating, using the digital computer 8, the policy for the future-epoch state by assigning to the future-epoch state an action according to a distribution of the obtained empirical means corresponding to the first group of qubits.

Still referring to FIG. 2 and according to processing step 68, the policy for the future-epoch state is updated with the action obtained in processing step 66.

According to processing step 70, the data representative of none or at least one coupler and at least one bias are amended using the generated future-epoch state-action pair. It will be appreciated that the data representative of none or at least one coupler and at least one bias are amended using the digital computer 8.

In the case where the sampling device comprises a quantum processor, if any of the qubits of the quantum processor represent action nodes, this processing step comprises switching every coupling between any qubit representative of an action node and any other qubit OFF. Then biases of the qubits corresponding to those hidden nodes of the general Boltzmann machine connected to visible nodes are updated using the generated future-epoch state-action pair.

In the case where the sampling device comprises the simulated quantum annealing application, if any of the spins of the simulated quantum annealing application represent action nodes, this processing step comprises setting weight between any spin representative of an action node and any other spin to zero. Then biases of the spins corresponding to those hidden nodes of the general Boltzmann machine connected to visible nodes are updated using the generated future-epoch state-action pair.

If the future-epoch state-action pair is represented by a vector v=(s, a) on the visible nodes, and the weight connecting state node i to hidden node j connected to it is $w_{ij}$ then the bias on the hidden node j is amended by adding $w_{ij}s_i$ to it. If the weight connecting action node k to a hidden node j connected to it is $w_{kj}$ then the bias on the hidden node j is amended by adding $w_{kj}a_k$ to it.

In the case where the sampling device comprises an optical device, data representative of the coupling weights and biases representative amended as described above are communicated to the energy source and modulators.

In the embodiment wherein the sampling device comprises a quantum processor, it will be appreciated that the couplings and biases of the quantum processor are amended using the digital computer 8 and the quantum device control system comprising the qubit control system 24 and the coupling device control system 30.

According to processing step 72, a sampling is performed. In the case where the sampling device comprises the quantum processor or an optical device, it will be appreciated that the sampling is quantum by the nature of these devices. It will be appreciated that the sampling corresponding to the future-epoch state-action pair is performed to obtain second sampling empirical means.

In the case where the sampling device comprises a quantum processor, the sampling corresponding to the future-epoch state-action pair is performed to obtain second quantum sampling empirical means corresponding to the qubits of the quantum processor.

In the case where the sampling device comprises an optical device, the sampling corresponding to the future-epoch state-action pair is performed to obtain second sampling empirical means corresponding to the optical parametric oscillators of the optical device.

More precisely, the second sampling empirical means comprises three pluralities of values.

A first plurality of values are the averages of the states each qubit corresponding to a hidden node is measured at in quantum sampling in the case where the sampling device comprises a quantum processor. In the case where the sampling device comprises an optical device, the first plurality of values are the averages of the spins corresponding to the measurements of the phases of the optical parametric oscillators. In the case where the sampling device comprises a simulated quantum annealing application, the first plurality of values are the averages of the values of spins. It will be appreciated by the skilled addressee that for the hidden node j this value may be denoted by $\langle h_j \rangle_v$ where v=(s, a) is the vector representative of the visible nodes corresponding to the present-epoch state-action pair.

A second plurality of values are the averages of the product of the states each pair of qubit corresponding to a pair of hidden nodes is measured at in quantum sampling in the case where the sampling device comprises a quantum processor. In the case where the sampling device comprises an optical device, the second plurality of values are the averages of the product of the values of spins corresponding to the measurements of the phases of the optical parametric oscillators. In the case where the sampling device comprises a simulated quantum annealing application, the second plurality of values are the averages of the products of values of spins. It will be appreciated by the skilled addressee that for the pair of hidden nodes j and k this value may be denoted by $\langle h_j h_k \rangle_v$.

In the case where the sampling device comprises a quantum processor, the third plurality of values are the frequencies of occurrences of each configuration of the qubits of the quantum processor denoted by $\mathbb{P}(h|v)$ where h is a binary vector representative of the states at which all qubits are measured at in each sample of the quantum sampling.

In the case where the sampling device comprises a simulated quantum annealing application for the classical Boltzmann machine, the third plurality of values are the frequencies of occurrences of each configuration of the spins denoted by $\mathbb{P}(h|v)$ where h is a binary vector representative of the states at which all spins are measured at in each sample of the sampling.

In the case where the sampling device comprises an optical device, the third plurality of values are the frequencies of occurrences of each configuration of spins corresponding to the phases of the optical parametric oscillators denoted by $\mathbb{P}(h|v)$ where h is a binary vector representative of values of spins corresponding to the measurements of the phases of the optical parametric oscillators at each sample of the sampling.

In the case where the sampling device comprises a quantum processor in the embodiment of a quantum Boltzmann machine, the third plurality of values are the frequencies of occurrences of each sample configurations of a classical effective Hamiltonian representative of the quantum Boltzmann machine denoted by $\mathbb{P}(c|v)$ where c is a binary vector representative of the states of all effective spins.

It will be further appreciated that, in the case where the sampling device comprises a quantum processor in the embodiment of a quantum Boltzmann machine, the sample configurations of an effective Hamiltonian are constructed by attaching measured values of qubits to the effective spins, wherein each measured configuration of qubits corresponds to a replica within the effective Hamiltonian.

In the case where the sampling device comprises a simulated quantum annealing application for a quantum Boltzmann machine, the third plurality of values are the frequencies of occurrences of each configuration of the effective spins of the effective Hamiltonian.

Still referring to FIG. 2 and according to processing step 74, a new approximation of a value of the Q-function is determined. It will be appreciated that the new approximation of the value of the Q-function is performed for the future-epoch state-action pair using the obtained second sampling empirical means. It will be appreciated that the Q-function is representative of a utility of the future-epoch state-action pair. In the case wherein the sampling device comprises a quantum processor, the approximation of the value of the Q-function is performed for the future-epoch state-action pair using the obtained second quantum sampling empirical means corresponding to the qubits of the quantum processor.

It will be appreciated that the approximation of the value of the Q-function is performed using the digital computer 8.

In one embodiment, the approximation of the value of the Q-function is performed using a remote processing unit operatively connected to the digital computer 8.

It will be appreciated that, in one embodiment and in the case where the sampling device comprises a quantum processor, the obtaining of the approximation of the value of the Q-function both at the present-epoch and at the future-epoch comprises obtaining from the sampling device a plurality of sample configurations of the Boltzmann machine along a measurement axis, constructing from the obtained sample configurations a plurality of samples of the configurations of an effective Hamiltonian representative of the quantum Boltzmann machine described above and using the digital computer 8 calculating an empirical approximation of a negative free energy of the quantum Boltzmann machine given by $$-F = -\sum_c \mathbb{P}(c|v)H(c|v) + \frac{1}{\beta}\sum_c \mathbb{P}(c|v)\ln(\mathbb{P}(c|v)).$$

It will be appreciated that, in one embodiment and in the case where the sampling device comprises a simulated quantum annealing for the quantum Boltzmann machine, the obtaining of the approximation of the value of the Q-function both at the present-epoch and at the future-epoch comprises obtaining from the sampling device a plurality of sample configurations of an effective Hamiltonian representative of the quantum Boltzmann machine described above and using the digital computer calculating an empirical approximation of a negative free energy of the quantum Boltzmann machine given by $$-F = -\sum_c \mathbb{P}(c|v)H(c|v) + \frac{1}{\beta}\sum_c \mathbb{P}(c|v)\ln(\mathbb{P}(c|v)).$$

It will be appreciated that, in another embodiment and in the case where the sampling device comprises a quantum processor or an optical device or a simulated quantum annealing, the obtaining of the approximation of the value of the Q-function both at the present-epoch and at the future-epoch comprises obtaining from the sampling device a plurality of sample configurations of a classical Boltzmann machine along a measurement axis, and using the digital computer 8 calculating an empirical approximation of a negative free energy of the classical Boltzmann machine given by $$-F = -\sum_c \mathbb{P}(h|v)H(h|v) + \frac{1}{\beta}\sum_c \mathbb{P}(h|v)\ln(\mathbb{P}(h|v)).$$

It will be appreciated that, in another embodiment, the obtaining of an approximation of the value of the Q-function both at the present-epoch and at the future-epoch comprises obtaining from the sampling device the approximation of the number of clusters in the Fortuin-Kasteleyn random cluster representation corresponding to the Boltzmann machine, and using the digital computer 8 for calculating an empirical approximation of a negative free energy of the Boltzmann machine using approximation of a number of clusters in the Fortuin-Kasteleyn random cluster representation. The negative free energy is given by $$-F = \frac{1}{\beta}\log(\rho \cdot \mathbb{E}(2^{\#c})).$$

Here the constant ρ depends on the weights and the biases of the Boltzmann machine in the case of classical Boltzmann machine and depends on the weights the biases and the transverse field strength of the Boltzmann machine in the case of quantum Boltzmann machine. The exponent #c represents the number of free clusters in the Fortuin-Kasteleyn random cluster representation.

Still referring to FIG. 2 and according to processing step 76, each weight and each bias of respectively each coupler and each node of the Boltzmann machine are updated using the generated approximations of the value of the Q-function and the first sampling empirical means at present-epoch state-action pair and a corresponding reward at the present-epoch state-action pair obtained using the reward structure. In the case where the sampling device comprises a quantum processor, each weight and each bias of the quantum processor are updated.

More precisely, each weight and each bias of respectively each coupler and each qubit of the quantum processor are updated using the generated approximations of the value of the Q-function and the first empirical means at the present-epoch state-action pair and a corresponding reward of the present-epoch state option pair obtained using the reward structure.

If r denoted the value of the present-epoch state-action pair reward, the weight connecting a visible node i to a hidden node k is updated via $$\Delta w_{ik} = \epsilon_n (r + \gamma Q_2 - Q_1) v_i \langle h_k \rangle_v.$$

The weight connecting hidden node k to hidden node j is updated via $$\Delta u_{kj} = \epsilon_n (r + \gamma Q_2 - Q_1) \langle h_k h_j \rangle_v.$$

And the bias on hidden node k is updated via $$\Delta b_k = \epsilon_n (r + \gamma Q_2 - Q_1) \langle h_k \rangle_v.$$

Here $Q_1$ is the approximation of the Q-function at the present-epoch state-action pair and $Q_2$ is the approximation of the Q-function at the future-epoch state-action pair.

According to the same processing step, the bias on any qubit of the quantum processor is updated by the update amount on the hidden node it represents.

According to the same processing step, the weight of any coupler of the quantum processor is updated by the update amount of the weight $u_{kj}$ or $w_{ik}$ is represents.

In one embodiment, each weight and each bias of the quantum processor are updated using the digital computer 8.

Still referring to FIG. 2 and according to processing step 78, a test is performed in order to find out if a stopping criterion is met. It will be appreciated by the skilled addressee that the stopping criterion may be of various types.

It is appreciated that in one embodiment the stopping criterion may comprise reaching a maximum number of training steps.

It is appreciated that in one alternative embodiment the stopping criterion may comprise reaching a maximum runtime.

It is appreciated that in one alternative embodiment the stopping criterion may comprise convergences of a function of the weights and biases of the couplings and local fields.

It is appreciated that in one alternative embodiment the stopping criterion may comprise convergence of the policy to a fixed policy.

In one alternative embodiment, the test comprises at least one stopping criterion.

In the case where the at least one stopping criterion is not met and according to processing step 56, a present-epoch state-action pair is generated either from the provided training data or from the environment.

In the case where the at least one stopping criterion is met, the policy is provided according to processing step 80.

It will be appreciated that the policy may be provided according to various embodiments. In fact, it will be appreciated that the best-known policy is provided using the digital computer 8.

In one embodiment, the policy is stored in the digital computer, and more precisely in the memory 22 of the digital computer 8.

In an alternative embodiment, the policy is displayed to a user interacting with the digital computer 8 via the display device 14.

In another alternative embodiment, the policy is transmitted to a remote processing unit operatively coupled with the digital computer 8.

It will be appreciated that a non-transitory computer-readable storage medium is further disclosed for storing computer-executable instructions which, when executed, cause a digital computer to perform a method for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the method comprising using a sampling device coupled to a digital computer and to a sampling device control system, the sampling device obtaining data representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers and a transverse field strength; obtaining, using the digital computer, initialization data comprising the set of actions, the set of states, the reward structure of the stochastic control problem and an initial policy for the stochastic control problem, the policy comprising a choice of at least one action for each state; using the digital computer and the sampling device control system, assigning data representative of an initial weight and a bias of respectively each coupler and each node and the transverse field strength of the Boltzmann machine to the sampling device; until a stopping criterion is met: generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, obtaining, using the digital computer, a future-epoch state-action pair, wherein the state is obtained through a stochastic state process, and further wherein the obtaining of the action comprises performing a stochastic optimization test on the plurality of all state-action pairs comprising the future-epoch state and any possible action to thereby provide the action at the future-epoch and update the policy for the future-epoch state; amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure, and providing the policy using the digital computer when the stopping criterion is met.

It will be appreciated that in one embodiment, the application for improving a policy for a stochastic control problem comprised in the memory unit 22 comprises instructions for using a sampling device coupled to the digital computer and to a sampling device control system, the sampling device obtaining data representative of sample configurations of a Boltzmann machine comprising a plurality of nodes, a plurality of couplers, a plurality of biases, each bias corresponding to a node in the plurality of nodes, a plurality of coupling weights, each coupling weight corresponding to a coupler of the plurality of couplers, and a transverse field strength. The application for improving a policy for a stochastic control problem comprised in the memory unit 22 further comprises instructions for obtaining, using the digital computer, initialization data comprising the set of actions, the set of states, the reward structure of the stochastic control problem and an initial policy for the stochastic control problem, the policy comprising a choice of at least one action for each state. The application for improving a policy for a stochastic control problem comprised in the memory unit 22 further comprises instructions for using the digital computer and the sampling device control system, assigning data representative of an initial weight and a bias of respectively each coupler and each node and the transverse field strength of the Boltzmann machine to the sampling device. The application for improving a policy for a stochastic control problem comprised in the memory unit 22 further comprises instructions for, until a stopping criterion is met: generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, obtaining, using the digital computer, a future-epoch state-action pair, wherein the state is obtained through a stochastic state process, and further wherein the obtaining of the action comprises performing a stochastic optimization test on the plurality of all state-action pairs comprising the future-epoch state and any possible action to thereby provide the action at the future-epoch and update the policy for the future-epoch state; amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure. The application for improving a policy for a stochastic control problem comprised in the memory unit 22 further comprises instructions for providing the policy using the digital computer when the stopping criterion is met.

It will be appreciated that an advantage of the method disclosed herein is that empirical means for action nodes and hidden nodes, components involved in approximating Q-functions, components involved in updating the weights between qubits, and the components involved in updating their biases are calculated using quantum sampling, therefor providing a faster method of Q-Learning.

It will be further appreciated that another advantage of the method disclosed herein is that it overcomes the curse of dimensionality experienced in traditional solution methods for Markov Decision processes.

Although the above description relates to specific embodiments as presently contemplated by the inventors, it will be understood that the invention in its broad aspect includes functional equivalents of the elements described herein.

The invention claimed is:

1. A method for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the method comprising:

using a sampling device coupled to a digital computer and to a sampling device control system, the sampling device is one of the following types: a quantum annealer, a quantum processor, a simulated quantum annealing application, a Fortuin-Kasteleyn random cluster representation and a network of optical parametric oscillator pulses, the sampling device obtaining data representative of sample configurations of a Boltzmann machine comprising:
a plurality of nodes comprising at least one visible node and at least two hidden nodes,
a plurality of couplers comprising at least one coupler between two hidden nodes,
a plurality of biases, each bias corresponding to a node in the plurality of nodes,
a plurality of coupling weights, each coupling weight corresponding to a coupler of the plurality of couplers, and
a transverse field strength;

obtaining, using the digital computer, initialization data comprising the set of actions, the set of states, the reward structure of the stochastic control problem and an initial policy for the stochastic control problem, the initial policy comprising a choice of at least one action for each state;

using the digital computer and the sampling device control system, assigning data representative of an initial weight and a bias of respectively each coupler and each node and the transverse field strength of the Boltzmann machine to the sampling device;

until a stopping criterion is met:
generating a present-epoch state-action pair using the digital computer,
using the digital computer and the sampling device control system, amending data representative of none or at least one coupler and at least one bias using the generated present-epoch state-action pair,
performing a sampling corresponding to the present-epoch state-action pair to obtain first sampling empirical means,
obtaining, using the first sampling empirical means, using the digital computer, an approximation of a value of a Q-function at the present-epoch state-action, the value of the Q-function being representative of a utility of the present-epoch state-action pair, wherein the approximation comprises using at least one of an effective classical Hamiltonian corresponding to the Boltzmann machine and the Fortuin-Kasteleyn representation corresponding to the Boltzmann machine,
obtaining, using the digital computer, a future-epoch state-action pair including a future-epoch state and an action, wherein the future-epoch state is obtained through a stochastic state process, and further wherein the obtaining of the action comprises performing a stochastic optimization test on a plurality of all state-action pairs comprising the future-epoch state and any possible action to thereby provide the action at the future-epoch and update the policy for the future-epoch state,
amending, using the digital computer and the sampling device control system, data representative of none or at least one coupler and at least one bias using the generated future-epoch state-action pair,
performing a sampling corresponding to the future-epoch state-action pair to obtain second sampling empirical means,
obtaining, using the second sampling empirical means, using the digital computer, an approximation of a value of the Q-function at the future-epoch state-action, the value of the Q-function being representative of a utility of the future-epoch state-action pair, and using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure; and providing the policy using the digital computer when the stopping criterion is met.

2. The method as claimed in claim 1, wherein the sampling device is a quantum processor and wherein the sampling device control system comprises a quantum device control system; further wherein the quantum processor is coupled to the digital computer and to the quantum device control system, further wherein the quantum processor comprises a plurality of qubits and a plurality of couplers, each coupler for providing a communicative coupling at a crossing of two qubits.

3. The method as claimed in claim 2, wherein the obtaining of the approximation of the value of the Q-function both at the present-epoch and at the future-epoch comprises obtaining from the sampling device a plurality of samples of configurations of the Boltzmann machine along a measurement axis and calculating using the digital computer an empirical approximation of a free energy of the Boltzmann machine.

4. The method as claimed in claim 2, wherein the obtaining of the approximation of the value of the Q-function both at the present-epoch and at the future-epoch comprises obtaining from the sampling device a plurality of sample configurations of the Boltzmann machine along a measurement axis, constructing from the obtained sample configurations a plurality of samples of configurations of an effective Hamiltonian representative of the quantum Boltzmann machine and using the digital computer calculating an empirical approximation of a free energy of the quantum Boltzmann machine.

5. The method as claimed in claim 2, wherein the calculating of both the first and the second empirical means corresponding to the nodes, comprises obtaining from the sampling device a plurality of samples of configurations of one of a quantum Boltzmann machine and a classical Boltzmann machine along a measurement axis and using the digital computer for calculating an approximation of the empirical means of the nodes.

6. The method as claimed in claim 1, wherein the sampling device comprises an optical device configured to receive energy from an optical energy source and generate a plurality of optical parametric oscillators, and a plurality of coupling devices, each of which controllably couples an optical parametric oscillator of the plurality of optical parametric oscillators.

7. The method as claimed in claim 6, wherein the obtaining of the approximation of the value of the Q-function both at the present-epoch and at the future-epoch comprises obtaining from the sampling device a plurality of samples of configurations of the Boltzmann machine along a measurement axis and calculating using the digital computer an empirical approximation of a free energy of the Boltzmann machine.

8. The method as claimed in claim 6, wherein the calculating of both the first and the second empirical means corresponding to the nodes, comprises obtaining from the sampling device a plurality of samples of configurations of one of a quantum Boltzmann machine and a classical Boltzmann machine along a measurement axis and using the digital computer for calculating an approximation of the empirical means of the nodes.

9. The method as claimed in claim 1, wherein the sampling device comprises a central processing unit and a memory unit coupled to the central processing unit and implementing the Boltzmann machine, wherein the Boltzmann machine implemented is a classical Boltzmann machine characterized by a zero value transverse field strength; further wherein the memory unit comprises an application for obtaining data representative of each weight and each bias of respectively each coupler and each node of the classical Boltzmann machine, further wherein the application is adapted for performing a simulated quantum annealing of the classical Boltzmann machine.

10. The method as claimed in claim 9, wherein the obtaining of the approximation of the value of the Q-function both at the present-epoch and at the future-epoch comprises obtaining from the sampling device a plurality of samples of configurations of the Boltzmann machine along a measurement axis and calculating using the digital computer an empirical approximation of a free energy of the Boltzmann machine.

11. The method as claimed in claim 9, wherein the calculating of both the first and the second empirical means corresponding to the nodes, comprises obtaining from the sampling device a plurality of samples of configurations of one of a quantum Boltzmann machine and the classical Boltzmann machine along a measurement axis and using the digital computer for calculating an approximation of the empirical means of the nodes.

12. The method as claimed in claim 1, wherein the sampling device comprises a central processing unit and a memory unit coupled to the central processing unit and implementing the Boltzmann machine, wherein the Boltzmann machine implemented is a quantum Boltzmann machine characterized by a non-zero value transverse field strength; further wherein the memory unit comprises an application for obtaining data representative of each weight and each bias of respectively each coupler and each node of the quantum Boltzmann machine; further wherein the application is adapted for performing a simulated quantum annealing of the quantum Boltzmann machine.

13. The method as claimed in claim 12, wherein the obtaining of the approximation of the value of the Q-function both at the present-epoch and at the future-epoch comprises obtaining from the sampling device a plurality of samples of configurations of the Boltzmann machine along a measurement axis and calculating using the digital computer an empirical approximation of a free energy of the Boltzmann machine.

14. The method as claimed in claim 12, wherein the obtaining of the approximation of the value of the Q-function both at the present-epoch and at the future-epoch comprises obtaining from the sampling device a plurality of sample configurations of the Boltzmann machine along a measurement axis, constructing from the obtained sample configurations a plurality of samples of configurations of an effective Hamiltonian representative of the quantum Boltzmann machine and using the digital computer calculating an empirical approximation of a free energy of the quantum Boltzmann machine.

15. The method as claimed in claim 12, wherein the calculating of both the first and the second empirical means corresponding to the nodes, comprises obtaining from the sampling device a plurality of samples of configurations of one of the quantum Boltzmann machine and a classical Boltzmann machine along a measurement axis and using the digital computer for calculating an approximation of the empirical means of the nodes.

16. The method as claimed in claim 12, wherein the performing of the simulated quantum annealing of the quantum Boltzmann machine provides a plurality of sample configurations of an effective Hamiltonian representative of the quantum Boltzmann machine.

17. The method as claimed in claim 16, wherein the obtaining of an approximation of the value of the Q-function both at the present-epoch and at the future-epoch comprises obtaining from the sampling device the plurality of sample configurations of the effective Hamiltonian representative of the quantum Boltzmann machine and using the digital computer calculating an empirical approximation of a free energy of the quantum Boltzmann machine.

18. The method as claimed in claim 16, wherein the calculating of both the first and the second empirical means corresponding to the nodes, comprises obtaining from the sampling device the plurality of sample configurations of the effective Hamiltonian of the Boltzmann machine and using the digital computer for calculating an approximation of the empirical means of the nodes.

19. The method as claimed in claim 1, wherein the sampling device comprises a central processing unit and a memory unit coupled to the central processing unit and implementing the Boltzmann machine, wherein the Boltzmann machine implemented is a classical Boltzmann machine characterized by a zero value transverse field strength; further wherein the memory unit comprises an application for obtaining data representative of each weight and each bias of respectively each coupler and each node of the classical Boltzmann machine, further wherein the sampling device is the Fortuin-Kastelyn random cluster representation, and the application is adapted for sampling a plurality of instances of the Fortuin-Kasteleyn random cluster representation corresponding to the classical Boltzmann machine to thereby provide an approximation of a number of clusters in the Fortuin-Kasteleyn random cluster representation.

20. The method as claimed in claim 1, wherein the sampling device comprises a central processing unit and a memory unit coupled to the central processing unit and implementing the Boltzmann machine, wherein the Boltzmann machine implemented is a quantum Boltzmann machine characterized by a non-zero value transverse field strength; further wherein the memory unit comprises an application for obtaining data representative of each weight and each bias of respectively each coupler and each node of the quantum Boltzmann machine; further wherein the sampling device is the Fortuin-Kastelyn random cluster representation, and the application is adapted for sampling a plurality of instances of a Fortuin-Kasteleyn random cluster representation corresponding to the quantum Boltzmann machine to thereby provide an approximation of a number of clusters in the Fortuin-Kasteleyn random cluster representation.

21. The method as claimed in claim 20, wherein the obtaining of an approximation of the value of the Q-function both at the present-epoch and at the future-epoch comprises obtaining from the sampling device the approximation of the number of clusters in the Fortuin-Kasteleyn random cluster representation corresponding to the quantum Boltzmann machine, and using the digital computer for calculating an empirical approximation of a free energy of the quantum Boltzmann machine.

22. The method as claimed in claim 1, wherein the performing of the stochastic optimization test on the plurality of all state-action pairs comprises:
using the digital computer and the sampling device control system, amending data representative of none or at least one coupler and at least one bias using each state-action pair corresponding to the future-epoch state,
performing a sampling corresponding to each state-action pair corresponding to the future-epoch state to provide empirical means, obtaining, using the digital computer, an approximation of a value of the Q-function at each state-action pair corresponding to the future-epoch state,
using all approximated Q-function values corresponding to each state-action pair corresponding to the future-epoch state, using the digital computer, sample from corresponding distribution to update the policy for the future epoch state.

23. The method as claimed in claim 1, wherein the performing of the stochastic optimization test on the plurality of all state-action pairs comprises:
obtaining a temperature parameter;
obtaining the future-epoch state;
sampling a Boltzmann distribution associated with the approximation of the value of the Q-function with a state variable fixed at the future-epoch state and the provided temperature.

24. The method as claimed in claim 2, wherein the plurality of qubits of the quantum processor comprises:
a first group of qubits;
a second group of qubits; and
wherein the plurality of couplers of the quantum processor comprises:
at least one coupler, each of the at least one couplers for providing a communicative coupling at a crossing between a qubit of the first group of qubits and at least one qubit of the second group of qubits, and
a plurality of couplers, each of the plurality of couplers for providing a communicative coupling at a crossing between a qubit in the second group of qubits and other qubit in the second group of qubits.

25. The method as claimed in claim 24, wherein the first group of qubits represents the set of actions of the stochastic control problem.

26. The method as claimed in claim 24, wherein the amending of data representative of none or at least one coupler and the at least one bias using the generated present-epoch state-action pair, comprises:
switching all couplers providing a communicative coupling at a crossing between a qubit of the first group of qubits and the second group of qubits OFF, and
amending at least one bias in the second group of qubits using the generated present-epoch state-action pair.

27. The method as claimed in claim 24, wherein the amending of data representative of none or at least one coupler and the at least one bias using the generated future-epoch state-action pair comprises:
switching all couplers providing a communicative coupling at a crossing between a qubit of the first group of qubits and the second group of qubits OFF, and
amending at least one bias in the second group of qubits using the generated future-epoch state-action pair.

28. The method as claimed in claim 24, wherein the performing of the stochastic optimization test on the plurality of all state-action pairs comprising the future-epoch state and any possible action comprises:
- switching all couplers providing a communicative coupling at a crossing between a qubit of the first group of qubits and the qubits of the second group of qubits ON;
- amending at least one bias in the second group of qubits using the future-epoch state corresponding to the future-epoch state-action pair;
- performing a quantum sampling to obtain empirical means corresponding to the first group of qubits; and
- updating, using the digital computer, the policy for the future-epoch state by assigning to the future-epoch state an action according to a distribution of the obtained empirical means corresponding to the first group of qubits.

29. The method as claimed in claim 1, wherein the stopping criterion comprises reaching a maximum number of training steps.

30. The method as claimed in claim 1, wherein the stopping criterion comprises reaching a maximum runtime.

31. The method as claimed in claim 1, wherein the stopping criterion comprises convergences of a function of the weights and biases of the couplings and local fields.

32. The method as claimed in claim 1, wherein the stopping criterion comprises convergence of the policy to a fixed policy.

33. The method as claimed in claim 1, wherein the providing of the policy comprises at least one of displaying the policy to a user interacting with the digital computer; storing the policy in the digital computer and transmitting the policy to another processing unit operatively connected to the digital computer.

34. The method as claimed in claim 1, wherein the digital computer comprises a memory unit; further wherein the initialization data is obtained from the memory unit of the digital computer.

35. The method as claimed in claim 1, wherein the initialization data is obtained from one of a user interacting with the digital computer and a remote processing unit operatively connected with the digital computer.

36. A digital computer comprising:
- a central processing unit;
- a display device;
- a communication port for operatively connecting the digital computer to a sampling device coupled to a digital computer and to a sampling device control system;
- a memory unit comprising an application for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the application comprising:
  - instructions for using a sampling device coupled to the digital computer and to a sampling device control system, the sampling device is one of the following types: a quantum annealer, a quantum processor, a simulated quantum annealing application, a Fortuin-Kasteleyn random cluster representation and a network of optical parametric oscillator pulses, the sampling device obtaining data representative of sample configurations of a Boltzmann machine comprising a plurality of nodes comprising at least one coupler between two hidden nodes, a plurality of couplers comprising at least one visible node and at least two hidden nodes, a plurality of biases, each bias corresponding to a node in the plurality of nodes, a plurality of coupling weights, each coupling weight corresponding to a coupler of the plurality of couplers, and a transverse field strength;
  - instructions for obtaining, using the digital computer, initialization data comprising the set of actions, the set of states, the reward structure of the stochastic control problem and an initial policy for the stochastic control problem, the initial policy comprising a choice of at least one action for each state;
  - instructions for using the digital computer and the sampling device control system, assigning data representative of an initial weight and a bias of respectively each coupler and each node and the transverse field strength of the Boltzmann machine to the sampling device;
  - instructions for, until a stopping criterion is met:
    - generating a present-epoch state-action pair using the digital computer,
    - using the digital computer and the sampling device control system, amending data representative of none or at least one coupler and at least one bias using the generated present-epoch state-action pair,
    - performing a sampling corresponding to the present-epoch state-action pair to obtain first sampling empirical means,
    - obtaining, using the first sampling empirical means, using the digital computer, an approximation of a value of a Q-function at the present-epoch state-action, the value of the Q-function being representative of a utility of the present-epoch state-action pair, wherein the approximation comprises using at least one of an effective classical Hamiltonian corresponding to the Boltzmann machine and the Fortuin-Kasteleyn representation corresponding to the Boltzmann machine,
    - obtaining, using the digital computer, a future-epoch state-action pair including a future-epoch state and an action, wherein the future-epoch state is obtained through a stochastic state process, and further wherein the obtaining of the action comprises performing a stochastic optimization test on a plurality of all state-action pairs comprising the future-epoch state and any possible action to thereby provide the action at the future-epoch and update the policy for the future-epoch state,
    - amending, using the digital computer and the sampling device control system, data representative of none or at least one coupler and at least one bias using the generated future-epoch state-action pair,
    - performing a sampling corresponding to the future-epoch state-action pair to obtain second sampling empirical means,
    - obtaining, using the second sampling empirical means, using the digital computer, an approximation of a value of the Q-function at the future-epoch state-action, the value of the Q-function being representative of a utility of the future-epoch state-action pair, and
    - using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure; and instructions for providing the policy using the digital computer when the stopping criterion is met.

37. A non-transitory computer readable storage medium for storing computer-executable instructions which, when executed, cause a digital computer to perform a method for improving a policy for a stochastic control problem, the stochastic control problem being characterized by a set of actions, a set of states, a reward structure as a function of states and actions, and a plurality of decision epochs, wherein evolution of an underlying stochastic state process depends on a plurality of actions in a policy, the method comprising:

using a sampling device coupled to a digital computer and to a sampling device control system, the sampling device is one of the following types: a quantum annealer, a quantum processor, a simulated quantum annealing application, a Fortuin-Kasteleyn random cluster representation and a network of optical parametric oscillator pulses, the sampling device obtaining data representative of sample configurations of a Boltzmann machine comprising:

a plurality of nodes comprising at least one visible node and at least two hidden nodes, a plurality of couplers comprising at least one coupler between two hidden nodes, a plurality of biases, each bias corresponding to a node in the plurality of nodes, a plurality of coupling weights, each coupling weight corresponding to a coupler of the plurality of couplers, and a transverse field strength;

obtaining, using the digital computer, initialization data comprising the set of actions, the set of states, the reward structure of the stochastic control problem and an initial policy for the stochastic control problem, the initial policy comprising a choice of at least one action for each state;

using the digital computer and the sampling device control system, assigning data representative of an initial weight and a bias of respectively each coupler and each node and the transverse field strength of the Boltzmann machine to the sampling device;

until a stopping criterion is met:

generating a present-epoch state-action pair using the digital computer, using the digital computer and the sampling device control system, amending data representative of none or at least one coupler and at least one bias using the generated present-epoch state-action pair, performing a sampling corresponding to the present-epoch state-action pair to obtain first sampling empirical means, obtaining, using the first sampling empirical means, using the digital computer, an approximation of a value of a Q-function at the present-epoch state-action, the value of the Q-function being representative of a utility of the present-epoch state-action pair, wherein the approximation comprises using at least one of an effective classical Hamiltonian corresponding to the Boltzmann machine and the Fortuin-Kasteleyn representation corresponding to the Boltzmann machine, obtaining, using the digital computer, a future-epoch state-action pair including a future-epoch state and an action, wherein the future-epoch state is obtained through a stochastic state process, and further wherein the obtaining of the action comprises performing a stochastic optimization test on a plurality of all state-action pairs comprising the future-epoch state and any possible action to thereby provide the action at the future-epoch and update the policy for the future-epoch state, amending, using the digital computer and the sampling device control system, data representative of none or at least one coupler and at least one bias using the generated future-epoch state-action pair, performing a sampling corresponding to the future-epoch state-action pair to obtain second sampling empirical means, obtaining, using the second sampling empirical means, using the digital computer, an approximation of a value of the Q-function at the future-epoch state-action, the value of the Q-function being representative of a utility of the future-epoch state-action pair, using the digital computer, updating each weight and each bias of respectively each coupler and each node of the Boltzmann machine using the generated approximations of the value of the Q-function and the first sampling empirical means at present-epoch state-action pair and a corresponding reward at the present-epoch state-action pair obtained using the reward structure; and providing the policy using the digital computer when the stopping criterion is met.

* * * * *